United States Patent
Oh et al.

(10) Patent No.: US 10,825,453 B2
(45) Date of Patent: Nov. 3, 2020

(54) ELECTRONIC DEVICE FOR PROVIDING SPEECH RECOGNITION SERVICE AND METHOD THEREOF

(71) Applicant: Samsung Electronics Co., Ltd., Suwon-si (KR)

(72) Inventors: Young Il Oh, Gwacheon-si (KR); Eun Kyung Lee, Seoul (KR); Jung Hion Choi, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/966,756

(22) Filed: Apr. 30, 2018

(65) Prior Publication Data
US 2018/0315426 A1   Nov. 1, 2018

(30) Foreign Application Priority Data
Apr. 28, 2017   (KR) .................. 10-2017-0055640

(51) Int. Cl.
*G10L 21/00* (2013.01)
*G10L 15/22* (2006.01)
(Continued)

(52) U.S. Cl.
CPC .............. *G10L 15/22* (2013.01); *G10L 15/02* (2013.01); *G10L 15/265* (2013.01); *G10L 15/063* (2013.01); *G10L 2015/0638* (2013.01); *G10L 2015/221* (2013.01); *G10L 2015/223* (2013.01); *G10L 2015/225* (2013.01); *G10L 2015/227* (2013.01)

(58) Field of Classification Search
CPC ...................................................... G10L 21/00

USPC .............. 704/275, 235, 260, 9, 231; 706/46; 705/317
See application file for complete search history.

(56) References Cited

U.S. PATENT DOCUMENTS 5,109,509 A * 4/1992 Katayama ............... G06F 40/47
                                                             704/9
6,480,819 B1   11/2002 Boman et al.
(Continued)

FOREIGN PATENT DOCUMENTS

EP      0 840 287 A2     5/1998
EP      1 031 964 A2     8/2000
(Continued)

OTHER PUBLICATIONS

Partial European Search Report dated Aug. 16, 2018, issued in the European patent application No. 18170135.0.
(Continued)

*Primary Examiner* — Michael Colucci
(74) *Attorney, Agent, or Firm* — Jefferson IP Law, LLP

(57) ABSTRACT

An electronic device is provided. The electronic device includes a microphone, a display, a memory, and a processor electrically connected to the microphone, the display, and the memory. The processor is configured to execute a speech recognition function, to obtain a first utterance from a user through the microphone, to display a text generated based on the first utterance, in the display, and to display at least one item, which corresponds to a portion recognized as a proper noun in the text and which is determined based on the first utterance and a personalized database of the user, in the display.

15 Claims, 13 Drawing Sheets

(51) Int. Cl.
*G10L 15/26* (2006.01)
*G10L 15/02* (2006.01)
*G10L 15/06* (2013.01)

(56) References Cited

U.S. PATENT DOCUMENTS

| | | |
|---|---|---|
| 8,762,156 B2 | 6/2014 | Chen |
| 8,812,316 B1 | 8/2014 | Chen |
| 8,812,317 B2 | 8/2014 | Jang et al. |
| 8,886,540 B2 | 11/2014 | Cerra et al. |
| 9,552,817 B2* | 1/2017 | Chang ............... G10L 15/063 |
| 9,640,175 B2 | 5/2017 | Liu et al. |
| 10,573,304 B2* | 2/2020 | Gemmeke ............ G10L 15/16 |
| 2009/0030684 A1 | 1/2009 | Cerra et al. |
| 2010/0179812 A1 | 7/2010 | Jang et al. |
| 2011/0054900 A1* | 3/2011 | Phillips ............... G10L 15/30 704/235 |
| 2012/0303371 A1* | 11/2012 | Labsky ............... G10L 21/06 704/260 |
| 2013/0080177 A1 | 3/2013 | Chen |
| 2013/0090921 A1 | 4/2013 | Liu et al. |
| 2014/0046891 A1* | 2/2014 | Banas ................. G06N 5/022 706/46 |
| 2015/0149163 A1* | 5/2015 | VanBlon ............. G10L 15/22 704/231 |
| 2015/0287043 A1* | 10/2015 | Michaelis ............ G16H 40/63 705/317 |
| 2015/0378579 A1* | 12/2015 | Kaplinger ........... G06F 16/957 715/745 |
| 2017/0092275 A1 | 3/2017 | Chang et al. |
| 2017/0337919 A1 | 11/2017 | Kato et al. |
| 2019/0348028 A1* | 11/2019 | Skobeltsyn .......... G06F 3/167 |
| 2020/0117336 A1* | 4/2020 | Mani ................... G06F 3/017 |

FOREIGN PATENT DOCUMENTS

| | | |
|---|---|---|
| EP | 2 575 128 A2 | 4/2013 |
| JP | 2002-229585 A | 8/2002 |
| KR | 10-2010-0083572 A | 7/2010 |
| KR | 10-1590724 B1 | 2/2016 |
| WO | 2016/188593 A1 | 12/2016 |
| WO | 2017/068826 A1 | 4/2017 |

OTHER PUBLICATIONS

Extended European Search Report dated Sep. 26, 2018, issued in the European patent application No. 18170135.0.

Indian Office Action dated Feb. 28, 2020, issued in Indian Patent Application No. 201814016192.

* cited by examiner

ELECTRONIC DEVICE FOR PROVIDING SPEECH RECOGNITION SERVICE AND METHOD THEREOF

CROSS-REFERENCE TO RELATED APPLICATION(S)

This application is based on and claims priority under 35 U.S.C. § 119 of a Korean patent application number 10-2017-0055640, filed on Apr. 28, 2017, in the Korean Intellectual Property Office, the disclosure of which is incorporated by reference herein in its entirety.

TECHNICAL FIELD

The disclosure relates to a technology to provide a speech recognition service in an electronic device.

BACKGROUND

An electronic device provides a voice input function using a speech recognition technology for the convenience of the user. The electronic device may perform natural language processing on a user's utterance. The electronic device grasps the user's intent through the natural language processing and provides the result matched to the user's intent.

Furthermore, the electronic device provides a speech secretary service based on artificial intelligence. The user may enter a command through the utterance, and the electronic device may perform the command corresponding to the utterance to act as the secretary of the user. At this time, the electronic device needs to perform an operation matched to the user's intent.

In the meantime, an artificial intelligence system is a computer system that implements human-level intelligence. The artificial intelligence system may learn and judge itself, and the recognition rate may improve as the artificial intelligence system is used.

An artificial intelligence technology (e.g., machine learning technology or deep learning technology) may include element technologies that simulate the function (e.g., recognition or determination) of the human brain by using an algorithm that classifies or learns the characteristics of pieces of input data by itself.

For example, the element technology may include at least one of a language understanding technology that recognizes a language or a character of a human, a visual understanding technology that recognizes objects like a human, an inference or prediction technique that determines information to logically infer and predict the determined information, a knowledge expression technology that processes human experience information as knowledge data, and an operation control technology that controls autonomous driving of the vehicle and the motion of the robot.

It is understood that a linguistic understanding technology is a technology to recognize and apply/process the language/character of the human. The linguistic understanding technology includes natural language processing, machine translation, dialogue system, query response, speech recognition/synthesis, and the like.

The above information is presented as background information only to assist with an understanding of the disclosure. No determination has been made, and no assertion is made, as to whether any of the above might be applicable as prior art with regard to the disclosure.

SUMMARY

In a speech secretary service provided by an electronic device, a user may enter a command for controlling the electronic device through utterance. In this case, terms (hereinafter, referred to as a "term with the high possibility of error"), which are not listed in the dictionary, such as a proper noun, a user-created coined word, or the like may be used.

In a speech recognition service, an error may occur in the speech recognition result due to the terms and the user's own pronunciation/audio fingerprint associated with the terms. In the case where the error occurs, since the incorrect control command is performed, the result that is not matched to the user's intent may be provided.

Aspects of the disclosure are to address at least the above-mentioned problems and/or disadvantages and to provide at least the advantages described below. Accordingly, an aspect of the disclosure is to provide an electronic device that solves the malfunction due to a term with the high possibility of error, a user's pronunciation associated with the term, or the like, in speech recognition.

In accordance with an aspect of the disclosure, an electronic device is provided. The electronic device includes a microphone, a display, a memory, and a processor electrically connected to the microphone, the display, and the memory. The processor is configured to execute a speech recognition function, to obtain a first utterance from a user through the microphone, display a text generated based on the first utterance, in the display, and display at least one item, which corresponds to a portion recognized as a proper noun in the text and which is determined based on the first utterance and a personalized database of the user, in the display.

In accordance with another aspect of the disclosure, a method performed by an electronic device is provided. The method includes executing a speech recognition function to obtain a first utterance from a user through a microphone, displaying a text generated based on the first utterance in a display, and displaying at least one item, which corresponds to a portion of the text recognized as a proper noun in the generated text and which is determined based on the first utterance and a personalized database of the user, in the display.

According to various embodiments of the disclosure, an electronic device may recognize a term with the high possibility of error in an operation of performing speech recognition and may perform a command including the term.

According to various embodiments of the disclosure, the electronic device may train specific pronunciation and audio fingerprint of a specific user with respect to terms with the high possibility of error.

Besides, a variety of effects directly or indirectly understood through this disclosure may be provided.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
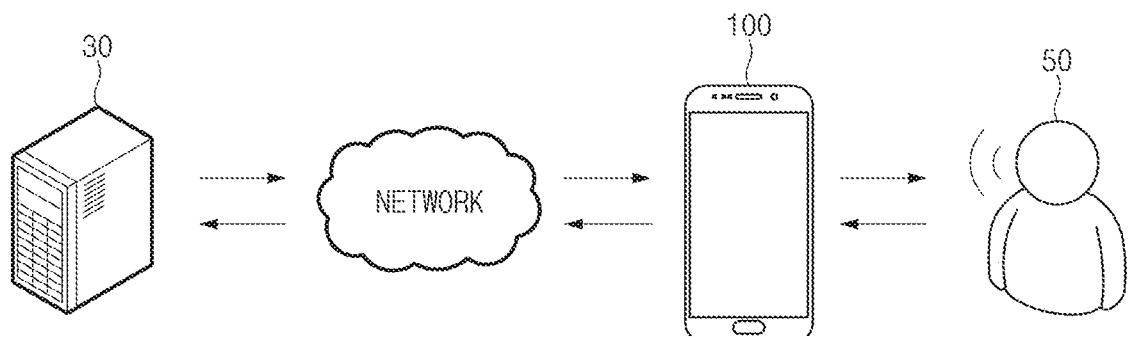
FIG. 1 illustrates an environment in which a voice input is made, according to an embodiment of the disclosure.

FIG. 1 illustrates an environment in which a voice input is made, according to an embodiment of the disclosure.

Referring to FIG. 1, an electronic device 100 may obtain utterance from a user 50. The electronic device 100 may execute a speech recognition function and may obtain a text generated based on the utterance. The generated text may correspond to a control command associated with the electronic device 100, which the user 50 intends.

In this specification, the speech recognition function may mean a function to convert the utterance, which is obtained from the user 50, into a text matched to the intent of the user 50. The electronic device 100 may execute the speech recognition function through an external device 30 (e.g., external server) providing the speech recognition function. For example, the external device 30 may be connected to the electronic device 100 over a network. Alternatively, the electronic device 100 may execute the speech recognition function through an automatic speech recognition (ASR) module in the electronic device 100.

In the former case, the electronic device 100 may transmit the obtained utterance to the external device 30 providing the speech recognition function and may receive the generated text based on the utterance. In the latter case, the electronic device 100 may generate the text converted from the utterance of the user 50, by using the ASR module.

Before performing the command corresponding to the generated text, the electronic device 100 may display the generated text in the display of the electronic device 100 for the purpose of determining whether the generated text is matched to the intent of the user 50.

The electronic device 100 may recognize a term, which has the high possibility of error, in the generated text. The electronic device 100 may highlight a specific portion including the recognized term (e.g., a highlight mark, or the like). The user 50 may verify the displayed term with the high possibility of error; in the case where the term is incorrectly recognized, the user 50 may revise the term to the correct (intended) term.

The term with the high possibility of error may include proper nouns, coined words, and newly coined words, which are not listed in the dictionary. The term may not be included in a general database used when the speech recognition function is provided. Accordingly, the term may be incorrectly recognized.

Hereinafter, it is described that a proper noun among terms with the high possibility of error is an example. However, an embodiment of the disclosure is not limited to the proper noun, and a device and a method according to an embodiment of the disclosure may be applied to all the terms with the high possibility of error.

The electronic device 100 may provide the user 50 with a recommendation item corresponding to the portion recognized as the proper noun. The recommendation item may be selected based on the utterance that the user 50 enters and the personalized database of the user 50. The personalized database may include data associated with the proper noun that is used through one or more programs by the user 50. The electronic device 100 may search for the item the same as or similar to the portion recognized as the proper noun, from the personalized database and may provide at least one item as the recommendation item.

Figure 2:
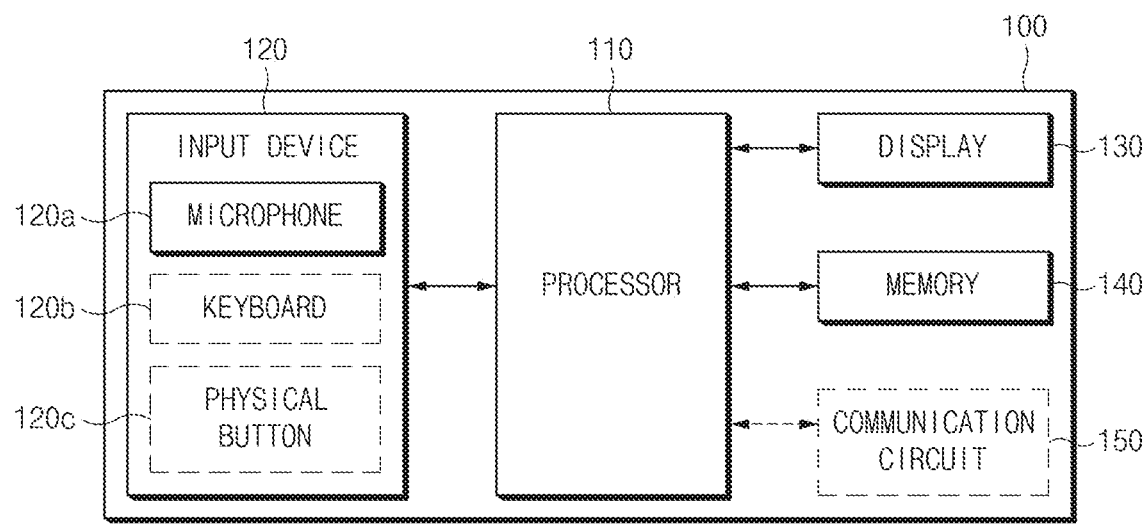
FIG. 2 is a block diagram illustrating a configuration of an electronic device, according to an embodiment of the disclosure.

FIG. 2 is a block diagram illustrating a configuration of an electronic device, according to an embodiment of the disclosure.

Referring to FIG. 2, the electronic device 100 may include a processor 110, an input device 120, a display 130, and a memory 140. In an embodiment, the electronic device 100 may include a microphone 120a, a keyboard 120b, a physical button 120c for executing a speech recognition function, and the like, as the input device 120. In addition, the electronic device 100 may further include a communication circuit 150 that communicates with the external device 30 or the like.

The processor 110 may be electrically connected to the microphone 120a, the display 130, and the memory 140 so as to exchange a signal with each other.

The microphone 120a may obtain utterance from the user 50. The microphone 120a may perform a noise canceling function for the purpose of grasping the intent of the user 50. Furthermore, the microphone 120a may convert an analog signal to a digital signal. The conversion of the signal may be performed by the processor 110. The converted digital signal may be used as an input in a process such as ASR, natural language processing, or the like.

The display 130 may display the generated text based on the utterance. In addition, the display 130 may display at least one item, which corresponds to a portion recognized as the proper noun in the text and which is determined based on the utterance and the personalized database of the user 50.

The personalized database may be associated with at least one application. For example, the personalized database may include a text entered by the user 50 in any application or a text collected or used through any application.

The electronic device 100 may display at least one item found from the personalized database, as a recommendation item, and thus, the electronic device 100 may provide the proper noun that a specific user frequently utilizes, as the recommendation item.

In an embodiment, the personalized database may be stored in the external device 30 connected to the electronic device 100 over a network. For example, the external device 30 may be a server providing a speech recognition function. At this time, the personalized database may be mapped to a specific instance of the user 50 and may be managed. For another example, the external device 30 may be a storage server.

In the case where the personalized database is stored in the external device 30, the external device 30 may divide a general database accessible by all users and the personalized database accessible by only a specific user and may store and manage the general database and the personalized database.

In another embodiment, the personalized database may be stored in a space, which is set to a secure area, in the storage space (e.g., the memory 140) of the electronic device 100. In the case where the personalized database is stored in the storage space of the electronic device 100, the general database may be stored in any storage space of the electronic device 100, and the personalized database may be stored in a separate secure area.

The personalized database may include personal information. When the speech recognition for another user is performed through an authentication procedure, the electronic device 100 may prevent the personalized database from being used. For example, when accessing the personalized database, the electronic device 100 may use previously entered user information. The user information may include biometric information such as a fingerprint, an iris, or the like, a password, or the like, which is entered by the user 50. Alternatively, the user information may be the user's pronunciation or audio fingerprint analyzed through the utterance obtained from the user 50.

In an embodiment, the electronic device 100 may further include the keyboard 120b as an input device. The electronic device 100 may obtain a keyboard input for assisting speech recognition through the keyboard 120b.

In an embodiment, the electronic device 100 may further include a physical button 120c for executing a speech recognition function. When an input associated with the physical button 120c occurs, the processor 110 may be configured to execute the speech recognition function. The user 50 may quickly execute the speech recognition function through the physical button 120c.

In an embodiment, the electronic device 100 may further include the communication circuit 150. The communication circuit 150 may perform a function that transmits data to the external device 30 and receives the data from the external device 30. For example, when transmitting the utterance obtained from the user 50 to an external device and when receiving the text generated based on the utterance, the electronic device 100 may use the communication circuit 150.

Figure 3:
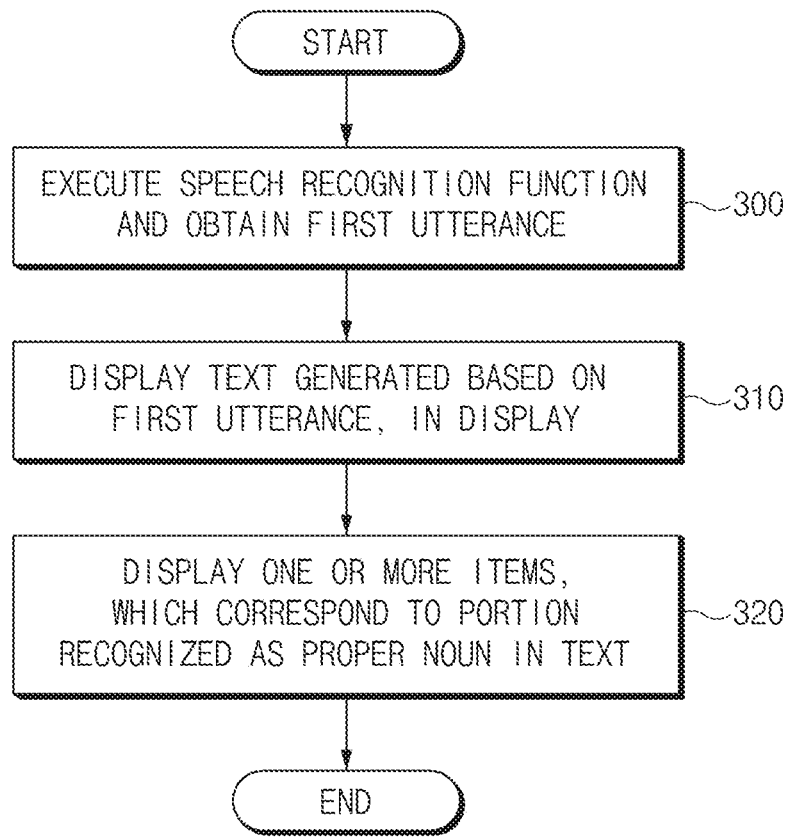
FIG. 3 illustrates a process to provide a speech secretary service, according to an embodiment of the disclosure.

FIG. 3 illustrates a process to provide a speech secretary service, according to an embodiment of the disclosure. The process of FIG. 3 may be performed by the electronic device 100 illustrated in FIG. 2.

Referring to FIG. 3, in operation 300, the processor (e.g., the processor 110 of FIG. 2) of an electronic device (e.g., the electronic device 100 of FIG. 1) may execute a speech recognition function and may obtain a first utterance from a user through a microphone (e.g., the microphone 120a of FIG. 2).

In an embodiment, the first utterance may correspond to a control command indicating an operation that a user desires to perform through the electronic device 100. The user may utter the control command by using a voice for the purpose of controlling the electronic device 100.

In operation 310, the processor 110 of the electronic device 100 may display the text generated based on the first utterance, in the display (e.g., the display 130 of FIG. 2). The user may determine whether the first utterance is entered to be matched to the user's intent, through a text displayed in the display 130.

In operation 320, the processor 110 of the electronic device 100 may display at least one item, which corresponds to a portion recognized as a proper noun, in the text in the display 130. For example, the at least one item may be referred to as a "recommendation item" corresponding to the proper noun. The at least one item may be determined based on the first utterance and the user's personalized database.

In operation 320, the processor 110 of the electronic device 100 may recognize the proper noun in the generated text. For example, the proper noun may include a person's name or the name of an object.

In an embodiment, the proper noun, which is used by a specific person, among proper nouns but is not in the dictionary, may be incorrectly recognized by the speech recognition function. The electronic device 100 may provide the recommendation item corresponding to the proper noun with reference to the personalized database.

For example, the electronic device 100 may compare the text of a portion recognized as the proper noun, with a text included in the personalized database to select an item similar to the text of the portion recognized as the proper noun in the personalized database. The electronic device 100 may calculate the similarity between both the texts by performing pattern matching or the like. The electronic device 100 may provide the recommendation item in descending order of calculated similarities.

The electronic device 100 may revise the portion recognized as the proper noun, to one item selected from items displayed in the display 130. The detailed operation thereof will be described below with reference to FIG. 5.

Figure 4:
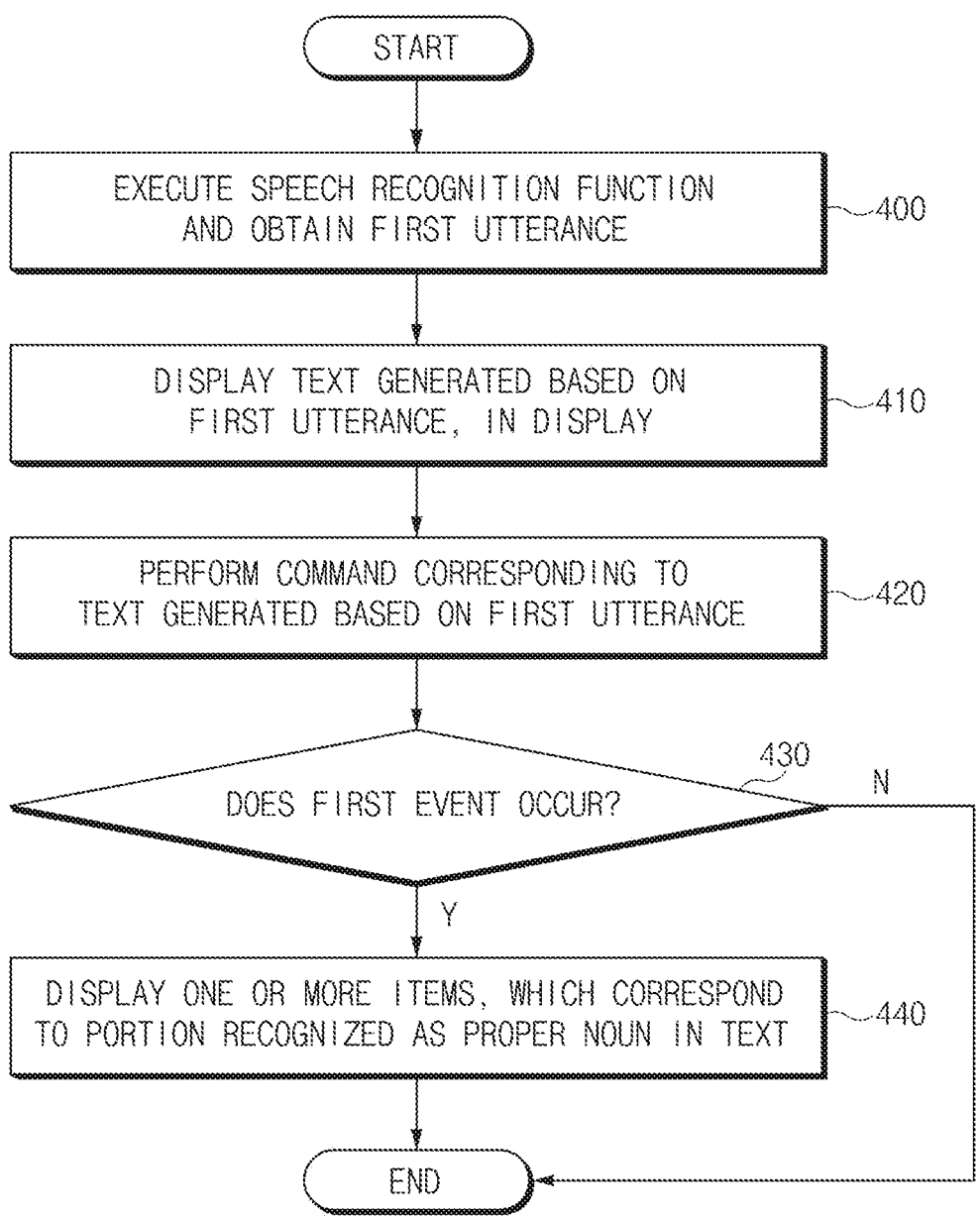
FIG. 4 illustrates a process to provide a speech secretary service, according to an embodiment of the disclosure.

FIG. 4 illustrates a process to provide a speech secretary service, according to an embodiment of the disclosure. The process of FIG. 4 may be performed by the electronic device 100 illustrated in FIG. 2.

Referring to FIG. 4, operation 400, operation 410, and operation 440 may correspond to operation 300, operation 310, and operation 320 described in FIG. 3. Thus, the detailed description thereof will not be repeated here.

In operation 420, the processor (e.g., the processor 110 of FIG. 2) of an electronic device (e.g., the electronic device 100 of FIG. 1) may perform the command corresponding to the generated text, by using at least one application.

Before operation 440 is performed, the electronic device 100 may perform a command corresponding to a text. In the case where the command is obtained depending on a user's intent, the command may be performed immediately. At this time, an operation of providing a recommendation item may be omitted.

In an embodiment, for the purpose of performing the command corresponding to the text, the electronic device 100 may launch at least one application and may perform the command by using the application.

For example, when a first utterance is "make a call to 'a'", the electronic device 100 may launch a call application and may make a call to 'a' by using the call application.

For another example, when the first utterance is "show a photo in which 'a' is present", the electronic device 100 may launch a photo application and may display the photo, in which 'a' is present, in a display (e.g., the display 130 of FIG. 2) by using the photo application.

In the above-described examples, 'a' may be a person's name. 'a' uttered by the user may be incorrectly recognized as 'b' that is similar to 'a' or is totally different from 'a'. In this case, the electronic device 100 may make a call to 'b' or may display a photo, in which 'b' is present, in the display. Alternatively, in the case where the name of 'b' is not in an address book or in the case where the name of 'b' has never been tagged with a photo, since the electronic device 100 cannot perform the above-mentioned commands, an error may occur.

In operation 430, when a first event for providing a notification of an execution result error of the command occurs, the processor 110 of the electronic device 100 may be configured to display at least one item corresponding to the portion recognized as the proper noun, in the display 130.

For example, the first event may occur in the case where the electronic device 100 is not capable of performing the command corresponding to a text generated based on the first utterance. When an error that the command is not capable of being executed occurs, the electronic device 100 may sense the first event.

For example, even though the electronic device 100 has performed the command, in the case where the execution result is not matched to the user's intent, the first event may occur. When the user's cancel command or revision command is present, the electronic device 100 may determine whether the first event occurs.

In operation 440, the at least one item may be determined based on the first utterance and the personalized database associated with the at least one application.

For example, the personalized database associated with the at least one application may be data input through a specific application or may include data that a specific application uses.

In various embodiments, the at least one application may include a call application, and the personalized database may include a contact list and a call record. At this time, the processor 110 of the electronic device 100 may be configured to display the at least one item in the display based on the first utterance, the contact list, and the call record.

For example, when a user utters "make a call to the mobile phone of Aliana", the electronic device 100 may launch the call application and may make a call to Aliana. When an error occurs, the electronic device 100 may search for a proper noun, which is the same as or similar to 'Aliana' being the portion recognized as the proper noun, from a contact list and a call record. The electronic device 100 may display 'Arianna', 'Alora', or the like, which is similar to 'Aliana', from among names included in the contact list and the call record, as a recommendation item.

In various embodiments, the at least one application may include a web browser, and the personalized database may include a search record input in the web browser. At this time, the processor 110 of the electronic device 100 may be configured to display the at least one item in the display based on the first utterance and the search record.

For example, when the user utters "search for YVES-SAINTLAURENT", the electronic device 100 may execute the web browser, may enter 'YVESSAINTLAURENT' into the search box of the web browser, and may provide the user with the search result. When an error occurs, the electronic device 100 may search for a proper noun, which is the same as or similar to 'YVESSAINTLAURENT' being the portion recognized as the proper noun, from the search record. The electronic device 100 may display 'TRENCH YVES SAINT LAURENT', 'CUIR YVES SAINT LAURENT', or the like, which is similar to 'YVESSAINTLAURENT', from among words included in the search record, as the recommendation item.

In various embodiments, the at least one application may include an email application, and the personalized database may include recipient information and sender information of an email. At this time, the processor 110 of the electronic device 100 may be configured to display the at least one item in the display based on the first utterance, the recipient information, and the sender information.

For example, when the user utters "send a mail to Smith's Samsung account", the electronic device 100 may launch a mail application and may send a mail to the account of smith@samsung.com. When an error occurs, the electronic device 100 may search for a proper noun, which is the same as or similar to 'smith' being the portion recognized as the proper noun, from the recipient information and the sender information. The electronic device 100 may display 'smiths@samsung.com', which is similar to 'smith', in a name included in the recipient information and the sender information or a mail address of the mail, as the recommendation item.

In various embodiments, the at least one application may include a social network application, and the personalized database may include a tag input in the social network and a location tag. At this time, the processor 110 of the electronic device 100 may be configured to display the at least one item in the display based on the first utterance, the tag, and the location tag.

For example, when the user utters "upload the photo captured today in Instagram with a tag of selfie", the electronic device 100 may launch Instagram, may input # selfie, and may upload a photo captured today. When an error occurs, the electronic device 100 may search for a proper noun, which is the same as or similar to 'selfie' being the portion recognized as the proper noun, from the tag, which has been input by the user through Instagram, and the location tag. The electronic device 100 may display 'selfies', 'self', 'selfpic', or the like, which is similar to 'selfie', among the tag and the location tag as a recommendation item.

In various embodiments, the at least one application may include a map application, and the personalized database may include a place name input in the map application. The processor 110 of the electronic device 100 may be configured to display the at least one item in the display based on the first utterance and the place name.

For example, when the user utters "find the way to Nonhyeon Station", the electronic device 100 may launch a map application, may input 'Nonhyeon Station', and may search for the path from the current location to Nonhyeon Station. When an error occurs, the electronic device 100 may search for a proper noun, which is the same as or similar to 'Nonhyeon Station' being the portion recognized as the proper noun, from the place name, which has been input by the user through the map application. The electronic device 100 may display 'Shin Nonhyeon Station', 'Nonhyun elementary school', 'Nonhyun Samgyetang', or the like, which is similar to 'Nonhyeon Station', in the place name as a recommendation item.

Figure 5:
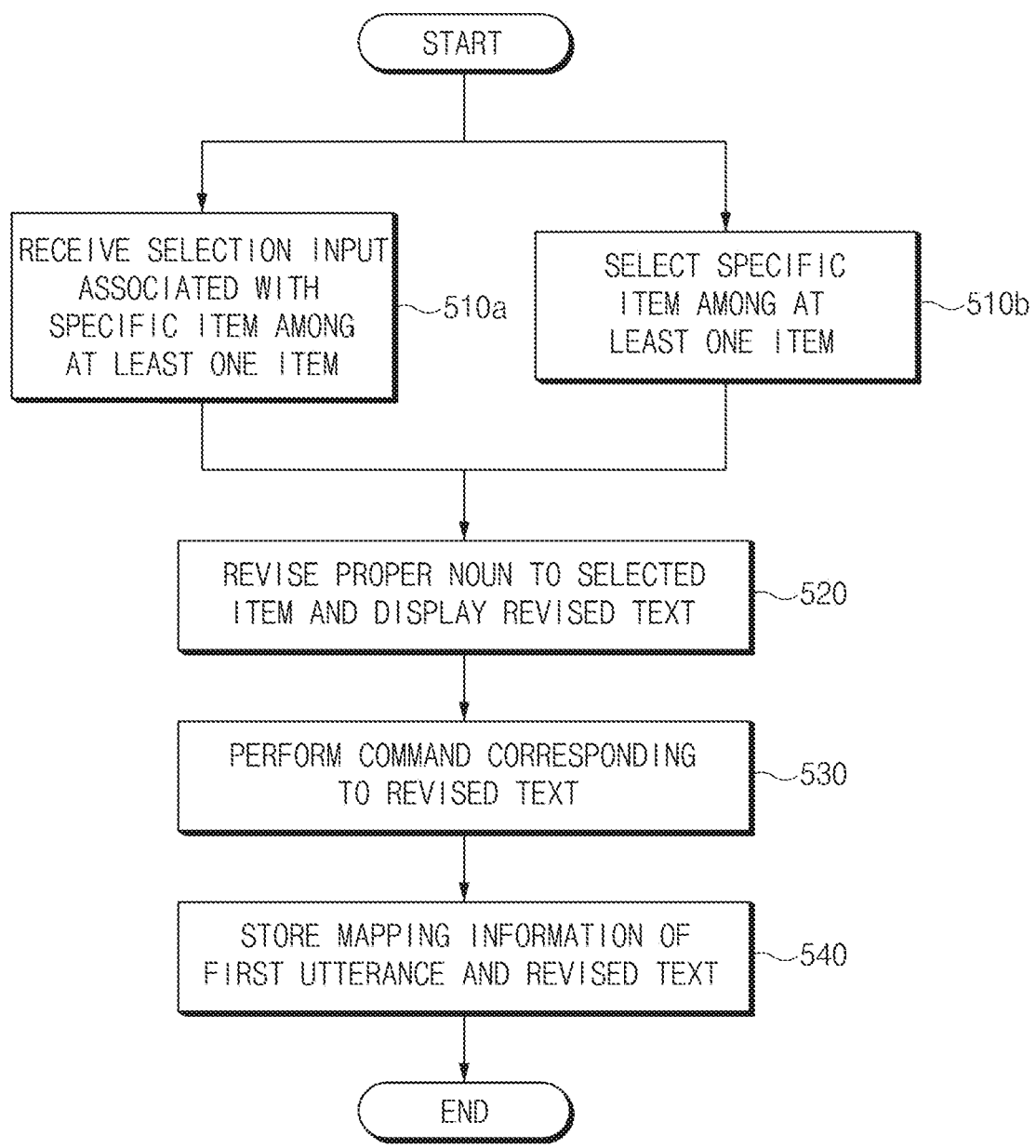
FIG. 5 illustrates a process to revise a proper noun when providing a speech secretary service, according to an embodiment of the disclosure.

FIG. 5 illustrates a process to revise a proper noun when providing a speech secretary service, according to an embodiment of the disclosure. The process of FIG. 5 may be performed by the electronic device 100 illustrated in FIG. 2. The process of FIG. 5 may be performed after operation 320 illustrated in FIG. 3 or operation 440 illustrated in FIG. 4.

Referring to FIG. 5, the processor (e.g., the processor 110 of FIG. 2) of an electronic device (e.g., the electronic device 100 of FIG. 1) may be configured to revise the proper noun in the generated text to an item selected from at least one recommendation item and to display the revised text in a display.

For example, in operation 510a, the processor 110 of the electronic device 100 may receive a selection input associated with a specific item among the recommendation item. The user may verify the displayed at least one recommendation item and may select a proper specific item.

For example, in operation 510b, the processor 110 of the electronic device 100 may select the specific item among the recommendation item. For example, the processor 110 may select a specific item based on the similarity between the proper noun and each of the displayed items. The electronic device 100 may select an item, the calculated similarity of which is the highest, as the specific item to be revised.

Operation 510a and operation 510b may be alternatively performed.

In operation 520, when the specific item is selected, the processor 110 of the electronic device 100 may revise a portion, which is recognized as a proper noun, in the generated text to an item selected from the at least one item. The processor 110 of the electronic device 100 may be configured to display the revised text in the display.

In operation 530, the processor 110 of the electronic device 100 may perform the command corresponding to the revised text by using one or more applications.

In operation 540, the processor 110 of the electronic device 100 may be configured to store the revised text, speech data corresponding to the first utterance, and mapping information of the revised text and the speech data corresponding to the first utterance, in a memory (e.g., the memory 140 of FIG. 2)

The electronic device 100 may refer to the mapping information in the case where the first utterance is obtained again. Afterwards, the electronic device 100 may generate the revised text based on the first utterance.

Figure 6:
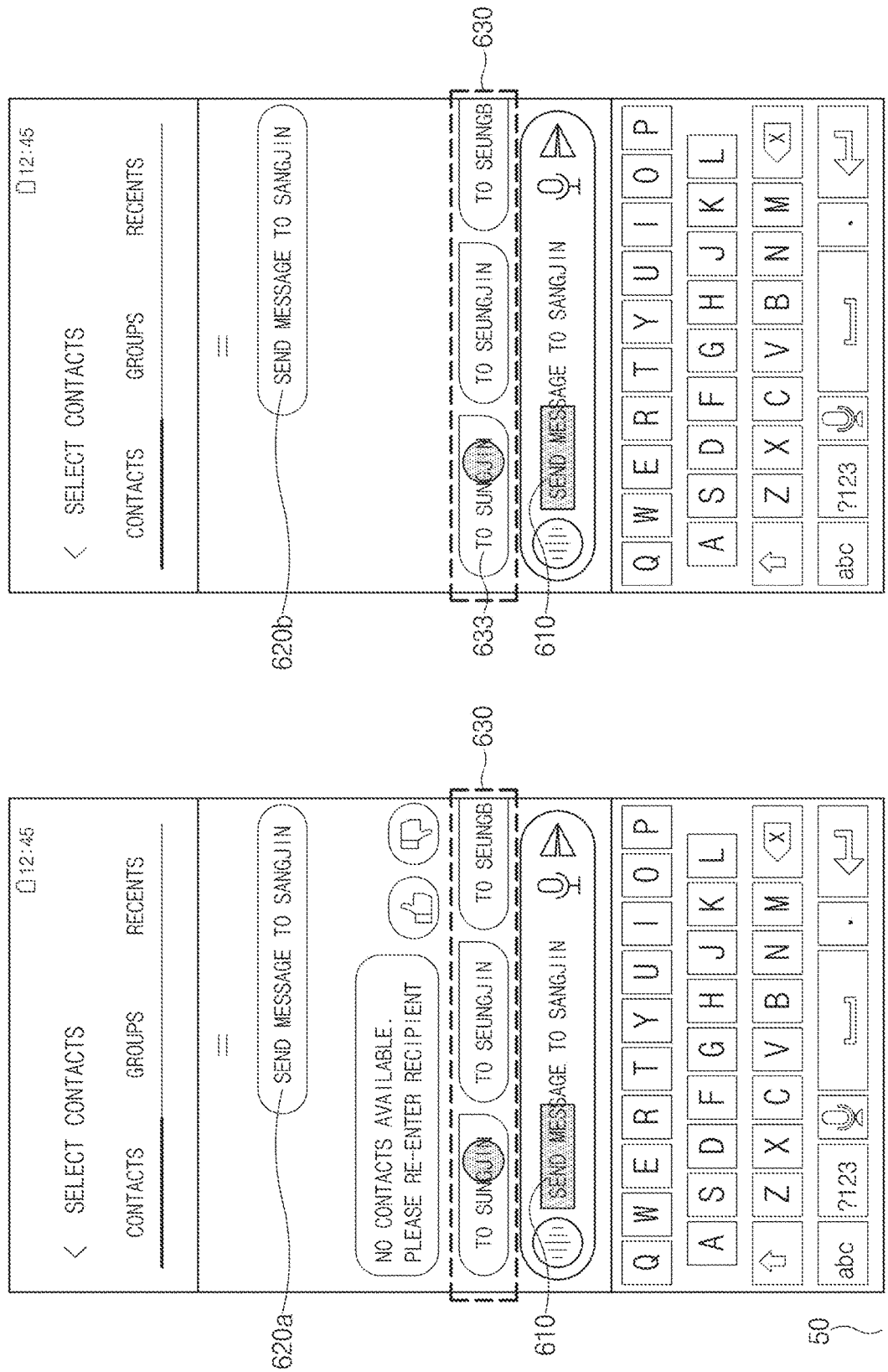
FIGS. 6A and 6B illustrate a user interface, according to an embodiment of the disclosure.

FIGS. 6A and 6B illustrate a user interface, according to an embodiment of the disclosure. In particular, FIGS. 6A and 6B illustrate a user interface capable of being provided in the case where a user utters a command saying 'send a message to a specific person'. The user interface may be displayed in the display (e.g., the display 130 of FIG. 2) of an electronic device (e.g., the electronic device 100 of FIG. 1).

Referring to FIGS. 6A and 6B, when the user 50 utters "send a message to Sungjin" (hereinafter referred to as a "first utterance"), the electronic device 100 may display the text generated based on a first utterance, on the user interface. The electronic device 100 may highlight and display a portion 610, which is recognized as the proper noun in the first utterance, in the display 130.

In the first utterance, both 'Sungjin' and 'message' are nouns. 'Message' is a noun on which the speech recognition is easily performed, as a word listed in a dictionary; on the other hand, 'Sungjin', which is the name of a person, is a proper noun with high probability of error in speech recognition.

The electronic device 100 may display a text 620a generated based on the first utterance, in the display 130 and may perform a command corresponding to the generated text 620a.

Referring to FIG. 6A, the first utterance may be incorrectly recognized as "send a message to Sangjin (620a)". The electronic device 100 may perform the command corresponding to the generated text 620a by using the message application. However, since the name of "Sangjin" is not in an address book accessible in a message application, the electronic device 100 may not perform the command. Accordingly, a first event for providing a notification of an error associated with the command may occur.

Referring to FIG. 6A, the electronic device 100 may display at least one item 630 corresponding to a portion recognized as a proper noun. The at least one item 630 may be a recommendation item associated with 'to Sangjin' that is the portion recognized as a proper noun. When the first utterance is obtained, the at least one item 630 may be displayed; or when the result obtained by performing the command corresponding to the generated text 620a indicates that an error occurs, the at least one item 630 may be displayed.

The at least one item 630 may be selected from text items stored in the personalized database associated with the message application. For example, the personalized database associated with the message application may include a contact list, information about a message recipient, and information about the message sender.

The at least one item 630 may be displayed in descending order of similarities. For example, 'to Sungjin', 'to Seungbin', and 'to Seungbin' may be displayed in order similar to 'to Sangjin'.

'To Sungjin' may be selected from the at least one item 633. 'to Sungjin' may be selected by the user's selection, and the electronic device 100 may select 'to Sungjin' based on the similarity.

When 'to Sungjin' being a specific item is selected from the at least one item 630, the electronic device 100 may revise 'to Sangjin', which is a portion recognized as a proper noun, to 'to Sungjin' being the selected item.

The electronic device 100 may perform the command corresponding to 'send a message to Sungjin' being the revised text 620b, by using the message application. After performing the command or while performing the command, the electronic device 100 may store mapping information of the first utterance and the revised text.

For example, the electronic device 100 may store speech data corresponding to the first utterance, the revised text 620b, and mapping information of the speech data and the revised text 620*b*, in a memory (e.g., the memory 140 of FIG. 2). For another example, the electronic device 100 may store speech data corresponding to a portion recognized as a proper noun, the selected item "to Sungjin", and mapping information of the speech data and the selected item, in the memory 140. Afterwards, when the first utterance is obtained again, the electronic device 100 may correctly perform speech recognition such that the first utterance is recognized as 'to Sungjin'.

Figure 7:
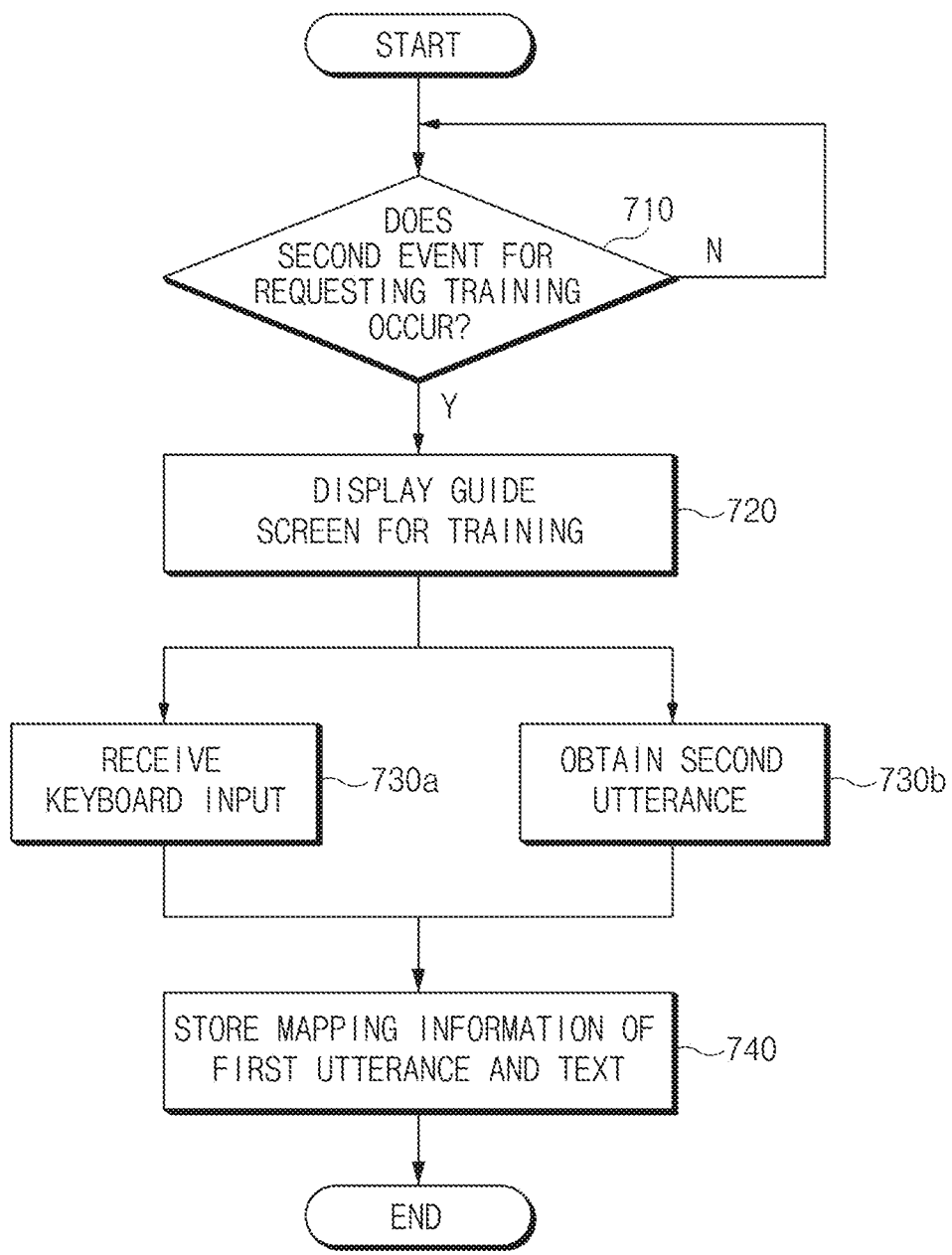
FIG. 7 illustrates a process to train a proper noun when a speech secretary service is provided, according to an embodiment of the disclosure.

FIG. 7 illustrates a process to train a proper noun when a speech secretary service is provided, according to an embodiment of the disclosure. The process of FIG. 7 may be performed by the electronic device 100 illustrated in FIG. 2.

The process of FIG. 7 may be performed after operation 320 illustrated in FIG. 3 or the process of FIG. 7 may be performed when a first event occurs in operation 430 illustrated in FIG. 4.

Referring to FIG. 7, in operation 710, the processor (e.g., the processor 110 of FIG. 2) of an electronic device (e.g., the electronic device 100 of FIG. 2) may sense the occurrence of a second event for requesting the training about a portion recognized as a proper noun.

For example, the electronic device 100 may display a specific icon in a display (e.g., the display 130 of FIG. 2); when receiving an input associated with the specific icon, the electronic device 100 may determine that the second event occurs. For another example, in the case where an utterance input is repeatedly canceled by a user, or in the case where the same utterance is obtained repeatedly, the electronic device 100 may determine that the second event occurs.

In operation 720, the processor 110 of the electronic device 100 may be configured to display a guide screen for the training about the portion recognized as a proper noun, in the display 130. The user may enter the correct text corresponding to the portion recognized as a proper noun, depending on the guide screen. The user may perform an input by using a keyboard or an utterance.

In operation 730*a*, the processor 110 of the electronic device 100 may receive a keyboard input corresponding to the portion recognized as a proper noun from the user through the keyboard (e.g., the keyboard 120*b* of FIG. 2).

In an embodiment, in the case where the number of characters of the portion recognized as a proper noun is not less than the predetermined number of characters, the processor 110 of the electronic device 100 may be configured to receive the keyboard input from the user through the keyboard 120*b*. The reason is that speech recognition for long words is more difficult than speech recognition for short words. Accordingly, the training about the portion recognized as a proper noun of the predetermined number of characters or more may be performed through the keyboard input.

In operation 740, the processor 110 of the electronic device 100 may be configured to store a text obtained through the keyboard input, speech data corresponding to the portion recognized as a proper noun in the first utterance, and mapping information of the text and speech data, in the memory.

In the case where the speech data corresponding to the portion recognized as a proper noun is obtained by the user, the electronic device 100 may convert the speech data into the correct proper noun by using the mapping information.

In operation 730*b*, the processor 110 of the electronic device 100 may be configured to obtain the second utterance corresponding to the portion recognized as a proper noun, from the user through the microphone 120*a*.

In an embodiment, the processor 110 of the electronic device 100 may be configured to obtain the second utterance for each character included in the portion recognized as a proper noun. Compared with a point in time when the second utterance is obtained at a time, the electronic device 100 may obtain the accurate conversion result at a point in time when the second utterance is obtained for each character.

In operation 740, the processor 110 of the electronic device 100 may be configured to store the text generated based on the second utterance, speech data corresponding to the portion recognized as a proper noun in the first utterance, and mapping information of the text and speech data, in the memory.

FIGS. 8A, 8B, 9A, and 9B illustrate a guide screen for training about a proper noun, according to an embodiment of the disclosure.

Figure 8B:
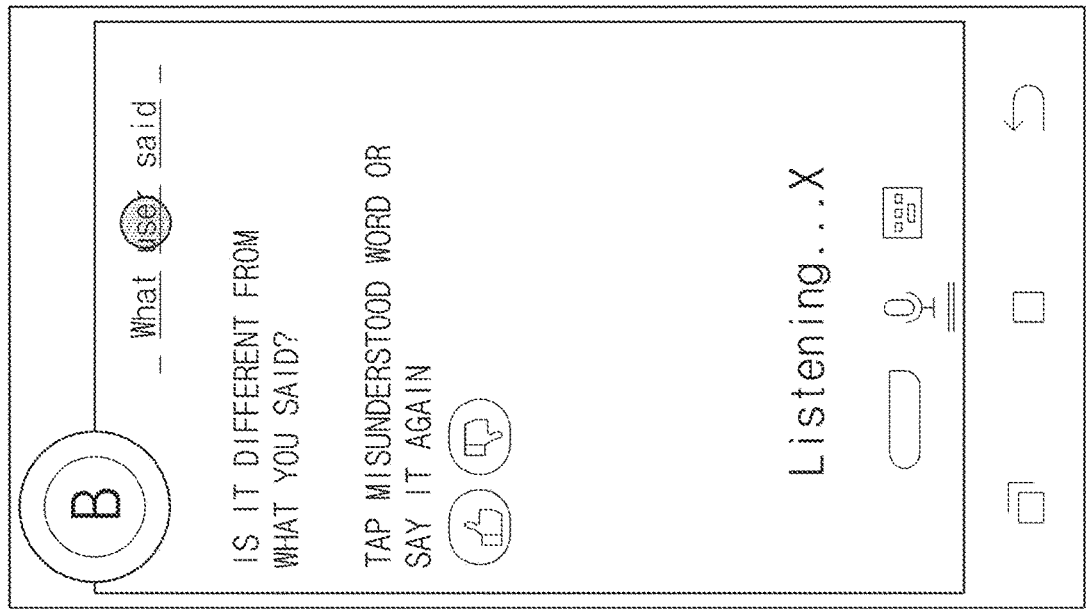
FIGS. 8A, 8B, 9A and 9B illustrate a guide screen for training about a proper noun, according to an embodiment of the disclosure.
Figure 8A:
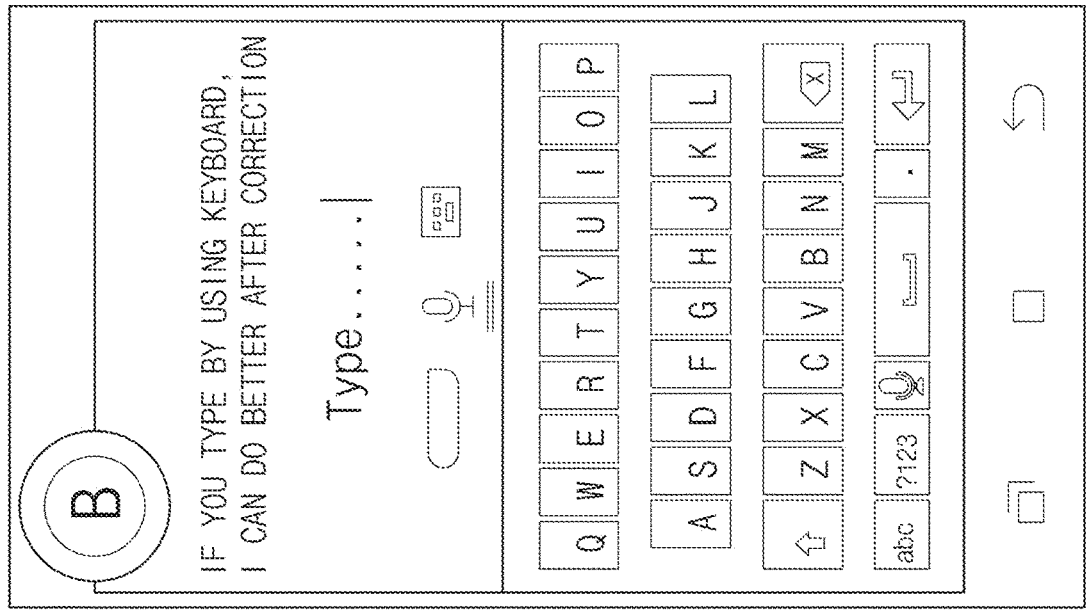

Referring to FIGS. 8A and 8B, FIG. 8A illustrates a guide screen for receiving a keyboard input, for the training about a portion recognized as a proper noun. FIG. 8B illustrates a guide screen for receiving a voice input, for the training about a portion recognized as a proper noun.

Referring to FIG. 8A, an electronic device (e.g., the electronic device 100 of FIG. 1) may receive a keyboard input associated with a portion recognized as a proper noun, which is a training target, from a user. The electronic device 100 may train the portion recognized as a proper noun, by using the input text. The training process is described through operation 730*a* and operation 740 of FIG. 7.

Referring to FIG. 8B, an electronic device may obtain an utterance associated with a portion recognized as a proper noun, which is a training target, from a user. The electronic device 100 may train the portion recognized as a proper noun, by using the obtained utterance. The training process is described through operation 730*b* and operation 740 of FIG. 7.

Figure 9B:
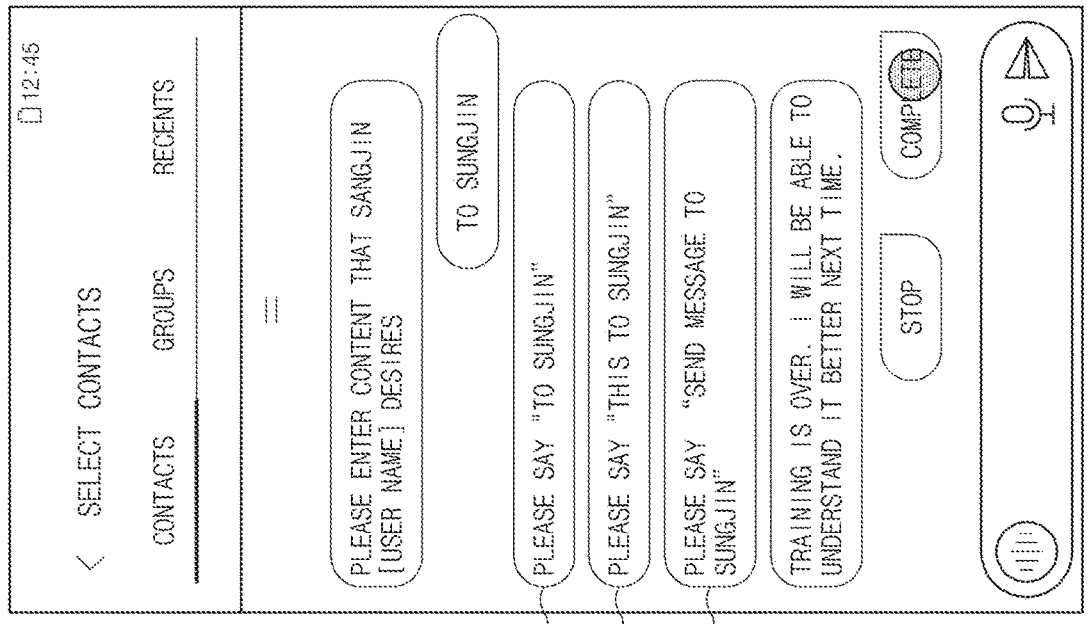
Figure 9A:
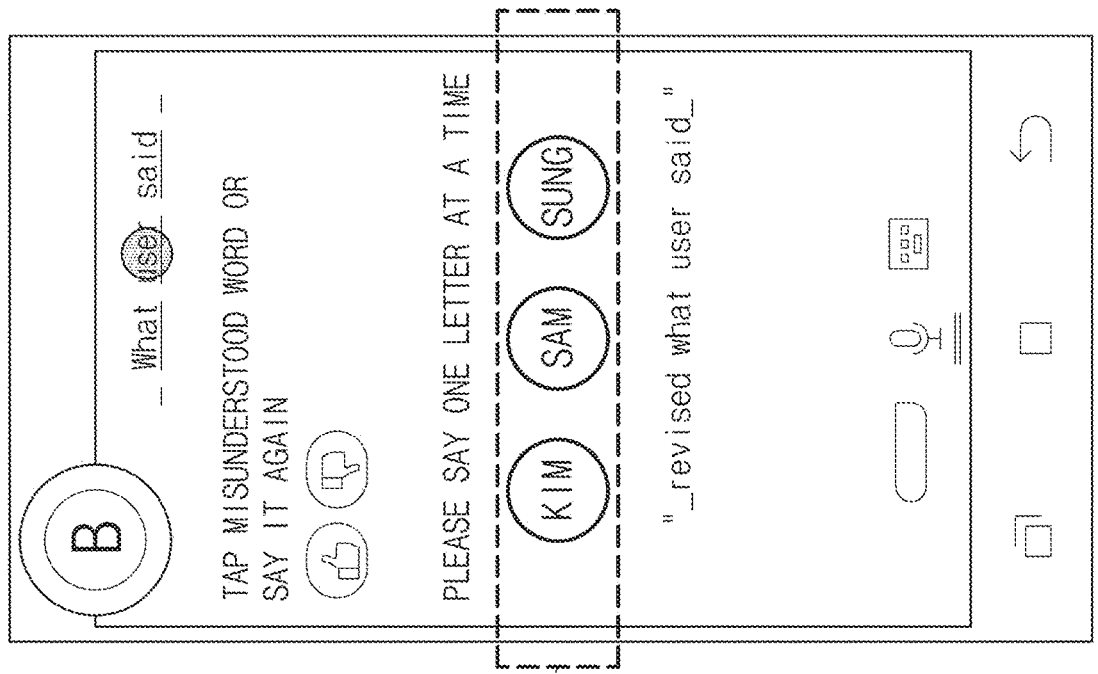

Referring to FIGS. 9A and 9B, FIG. 9A and FIG. 9B illustrate a guide screen for training. For the purpose of obtaining an utterance associated with a portion recognized as a proper noun, the electronic device 100 may display FIG. 9A and/or FIG. 9B in a display (e.g., the display 130 of FIG. 2).

Referring to FIG. 9A, the electronic device 100 may obtain an utterance for each character included in a portion recognized as a proper noun (refer to area 900). This operation is described as an example of operation 730*b* in FIG. 7.

Referring to FIG. 9B, the electronic device 100 may display area 910-1 in the display 130 and may obtain an utterance corresponding to "to Sungjin" that is the portion recognized as a proper noun. In addition, the electronic device 100 may display area 910-2 in the display 130 and may obtain an utterance corresponding to "this to Sungjin" including the portion recognized as a proper noun. Furthermore, the electronic device 100 may display area 910-3 in the display 130 and may obtain an utterance corresponding to "send a message to Sungjin" including the portion recognized as a proper noun.

Referring to FIG. 9B, all of the case where a portion recognized as a proper noun is singularly uttered, the case where an arbitrary word in front of a portion recognized as a proper noun is included and uttered, and the case where an arbitrary word behind a portion recognized as a proper noun is included and uttered may be trained. The illustrated area 910-1 to area 910-3 is exemplary. The electronic device 100 may combine an arbitrary word with the portion recognized as a proper noun in front of and/or behind the portion and may guide the training.

According to various embodiments disclosed in the disclosure, an electronic device may include a microphone, a display, a memory, and a processor electrically connected to the microphone, the display, and the memory. The processor may configured to execute a speech recognition function, to obtain a first utterance from a user through the microphone, to display a text generated based on the first utterance, in the display, and to display at least one item, which corresponds to a portion recognized as a proper noun in the text and which is determined based on the first utterance and a personalized database of the user, in the display.

According to various embodiments disclosed in the disclosure, the electronic device may further include a physical button for performing the speech recognition function. The processor may be configured, when an input associated with the physical button occurs, to perform the speech recognition function.

According to various embodiments disclosed in the disclosure, the processor may be configured to perform a command corresponding to the generated text by using at least one application and, when a first event for providing a notification of an execution result error of the command occurs, to display the at least one item determined based on the first utterance and the personalized database associated with the at least one application, in a display.

According to various embodiments disclosed in the disclosure, the at least one application may include a call application. The personalized database may include a contact list and a call record, and the processor may be configured to display the at least one item in the display based on the first utterance, the contact list, and the call record.

According to various embodiments disclosed in the disclosure, the at least one application may include a web browser. The personalized database may include a search record input in the web browser, and the processor may be configured to display the at least one item in the display based on the first utterance and the search record.

According to various embodiments disclosed in the disclosure, the at least one application may include an email application. The personalized database may include recipient information and sender information of an email, and the processor may be configured to display the at least one item in the display based on the first utterance, the recipient information, and the sender information.

According to various embodiments disclosed in the disclosure, the at least one application may include a social network application. The personalized database may include a tag and a location tag that are input in the social network application, and the processor may be configured to display the at least one item in the display based on the first utterance, the tag, and the location tag.

According to various embodiments disclosed in the disclosure, the at least one application may include a map application. The personalized database may include a place name input in the map application, and the processor may be configured to display the at least one item in the display based on the first utterance and the place name.

According to various embodiments disclosed in the disclosure, the processor may be configured to revise the portion recognized as the proper noun in the generated text, to an item selected from the at least one item, and to display the revised text in the display.

According to various embodiments disclosed in the disclosure, the processor may be configured to store the revised text, speech data corresponding to the first utterance, and mapping information of the revised text and the speech data corresponding to the first utterance, in the memory.

According to various embodiments disclosed in the disclosure, the processor may be configured, when a second event for requesting training about the portion recognized as the proper noun occurs, to display a guide screen for the training about the portion recognized as the proper noun, in the display.

According to various embodiments disclosed in the disclosure, the processor may be configured to obtain a second utterance corresponding to the portion recognized as the proper noun from the user through the microphone.

According to various embodiments disclosed in the disclosure, the processor may be configured to obtain the second utterance for each character included in the portion recognized as the proper noun.

According to various embodiments disclosed in the disclosure, the processor may be configured to store a text generated based on the second utterance, speech data corresponding to the portion recognized as the proper noun in the first utterance, and mapping information of the text generated based on the second utterance and the speech data corresponding to the portion recognized as the proper noun in the first utterance, in the memory.

According to various embodiments disclosed in the disclosure, the electronic device may further include a keyboard. The processor may be configured to receive a keyboard input corresponding to the portion recognized as the proper noun, from the user through the keyboard.

According to various embodiments disclosed in the disclosure, the processor may be configured, when the portion recognized as the proper noun is not less than a predetermined number of characters, to receive a keyboard input from the user through the keyboard.

According to various embodiments disclosed in the disclosure, the processor may be configured to store a text obtained through the keyboard input, speech data corresponding to the portion recognized as the proper noun in the first utterance, and mapping information of the text obtained through the keyboard input and the speech data corresponding to the portion recognized as the proper noun in the first utterance, in the memory.

According to various embodiments disclosed in the disclosure, a method performed by an electronic device includes executing a speech recognition function to obtain a first utterance from a user through a microphone, displaying a text generated based on the first utterance in a display, and displaying at least one item, which corresponds to a portion recognized as a proper noun in the generated text and which is determined based on the first utterance and a personalized database of the user, in the display.

According to various embodiments disclosed in the disclosure, the method may further include performing a command corresponding to the generated text by using at least one application. The displaying of the at least one item in the display includes, when a first event for providing a notification of an execution result error of the command occurs, displaying the at least one item, which is determined based on the personalized database associated with the at least one application, in the display.

According to various embodiments disclosed in the disclosure, the method may further include revising the portion recognized as the proper noun to one item selected from the at least one item to display the revised text in the display, and performing a command corresponding to the revised text by using the at least one application.

Figure 10:
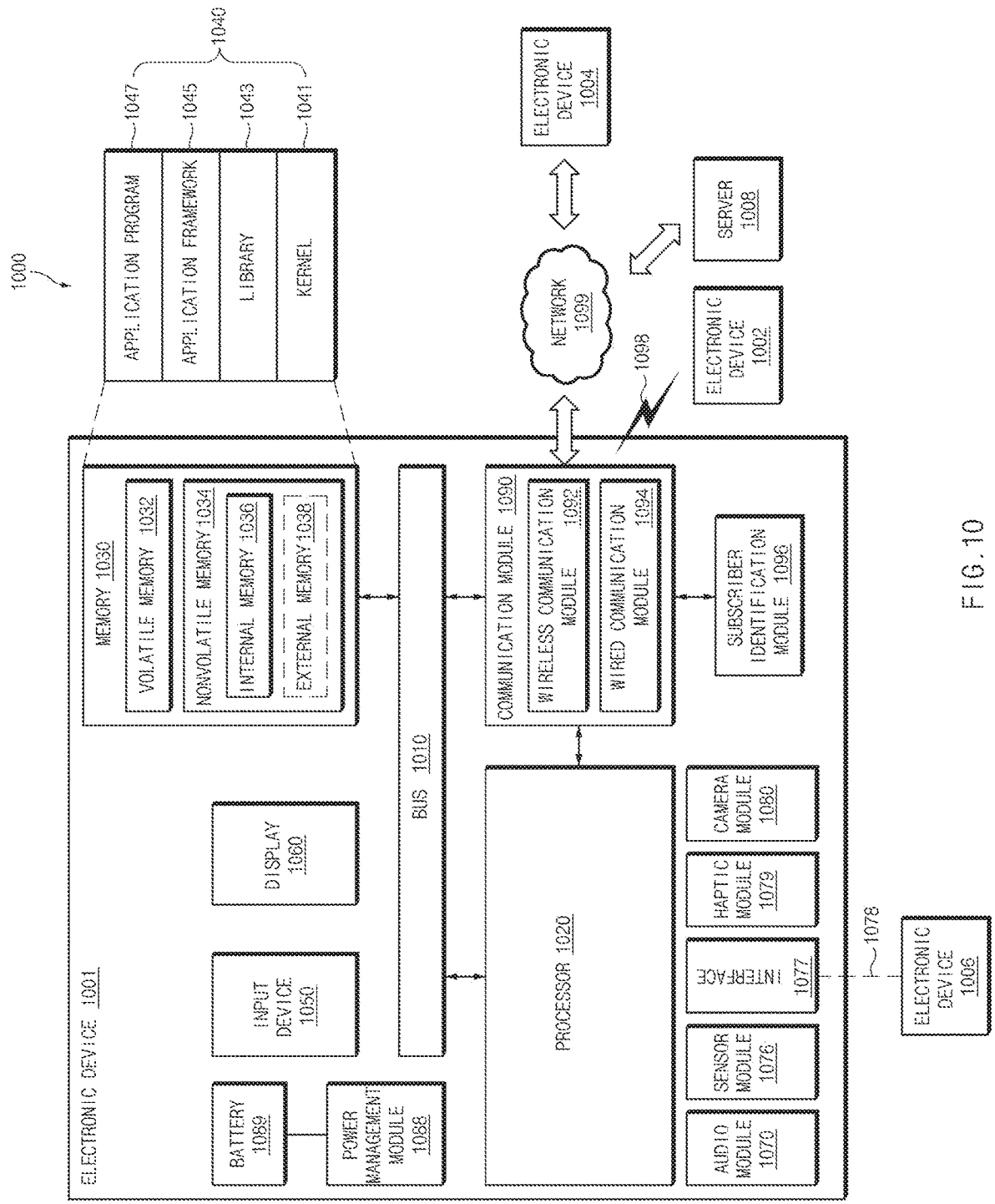
FIG. 10 illustrates an electronic device in a network environment, according to various embodiments of the disclosure.

FIG. 10 illustrates an electronic device in a network environment, according to various embodiments of the disclosure.

Referring to FIG. 10, in a network environment 1000, an electronic device 1001 may include various types of devices. For example, the electronic device 1001 may include at least one of a portable communication device (e.g., a smartphone), a computer device (e.g., a personal digital assistant (PDA), a tablet personal computers (PC), a laptop PC, a desktop PC, a workstation, or a server), a portable multimedia device (e.g., an e-book reader or an MP3 player), a portable medical device (e.g., a heart rate, blood glucose, blood pressure, or a thermometer), a camera, or a wearable device. A wearable device may include at least one of an accessory type of a device (e.g., a timepiece, a ring, a bracelet, an anklet, a necklace, glasses, a contact lens, or a head-mounted device (HMD)), one-piece fabric or clothes type of a device (e.g., electronic clothes), a body-attached type of a device (e.g., a skin pad or a tattoo), or a bio-implantable circuit. According to various embodiments, the electronic device may include at least one of, for example, televisions (TVs), digital versatile disc (DVD) players, audio devices, audio accessory devices (e.g., a speaker, a headphone, or a headset), a refrigerator, an air conditioner, a cleaner, an oven, a microwave oven, a washing machine, an air cleaner, a set-top box, a home automation control panel, a security control panel, a game console, an electronic dictionary, an electronic key, a camcorder, or an electronic picture frame.

According to another embodiment, the electronic device may include at least one of a navigation device, a global navigation satellite system (GNSS), an event data recorder (EDR) (e.g., a black box for a car, a ship, or a plane), a vehicle infotainment device (e.g., a head-up display for a vehicle), an industrial or home robot, a drone, an automated teller machine (ATM), a point of sales (POS) device, a measurement device (e.g., a water meter, an electricity meter, or a gas meter), or Internet of things (e.g., a light bulb, a sprinkler device, a fire alarm, a thermostat, or a street lamp). According to an embodiment of the disclosure, the electronic device is not limited to the above-described devices. For example, similarly to a smartphone having function of measuring personal bio-information (e.g., a heart rate or blood glucose), the electronic device may provide functions of multiple devices in the complex manner. In the disclosure, the term "user" used herein may refer to a person who uses the electronic device or may refer to a device (e.g., an artificial intelligence electronic device) that uses the electronic device.

Referring to FIG. 10, under the network environment 1000, the electronic device 1001 (e.g., the electronic device 100 of FIG. 1) may communicate with a first external electronic device 1002 through local wireless communication 1098 or may communication with a second external electronic device 1004 or a server 1008 through a second network 1099. According to an embodiment, the electronic device 1001 may communicate with the second external electronic device 1004 through the server 1008.

According to an embodiment, the electronic device 1001 may include a bus 1010, a processor 1020 (e.g., the processor 110 of FIG. 2) a memory 1030, an input device 1050 (e.g., a micro-phone or a mouse), a display 1060, an audio module 1070, a sensor module 1076, an interface 1077, a haptic module 1079, a camera module 1080, a power management module 1088, a battery 1089, a communication module 1090, and a subscriber identification module (SIM) 1096. According to an embodiment, the electronic device 1001 may not include at least one (e.g., the display 1060 or the camera module 1080) of the above-described elements or may further include other element(s).

For example, the bus 1010 may interconnect the above-described elements 1020 to 1090 and may include a circuit for conveying signals (e.g., a control message or data) between the above-described elements.

The processor 1020 may include one or more of a central processing unit (CPU), an application processor (AP), a graphics processing unit (GPU), an image signal processor (ISP) of a camera or a communication processor (CP). According to an embodiment, the processor 1020 may be implemented with a system on chip (SoC) or a system in package (SiP). For example, the processor 1020 may drive an operating system (OS) or an application to control at least one of another element (e.g., hardware or software element) connected to the processor 1020 and may process and compute various data. The processor 1020 may load a command or data, which is received from at least one of other elements (e.g., the communication module 1090), into a volatile memory 1032 to process the command or data and may store the process result data into a nonvolatile memory 1034.

The memory 1030 may include, for example, the volatile memory 1032 or the nonvolatile memory 1034. The volatile memory 1032 may include, for example, a random access memory (RAM) (e.g., a dynamic RAM (DRAM), a static RAM (SRAM), or a synchronous dynamic RAM (SDRAM)). The nonvolatile memory 1034 may include, for example, a one-time programmable read-only memory (OTPROM), a programmable ROM (PROM), an erasable programmable ROM (EPROM), an electrically erasable programmable ROM (EEPROM), a mask ROM, a flash ROM, a flash memory, a hard disk drive, or a solid-state drive (SSD). In addition, the nonvolatile memory 1034 may be configured in the form of an internal memory 1036 or the form of an external memory 1038 which is available through connection only if necessary, according to the connection with the electronic device 1001. The external memory 1038 may further include a flash drive such as compact flash (CF), secure digital (SD), micro-SD, mini-SD, extreme digital (xD), a multimedia card (MMC), or a memory stick. The external memory 1038 may be operatively or physically connected with the electronic device 1001 in a wired manner (e.g., a cable or a universal serial bus (USB)) or a wireless (e.g., Bluetooth) manner.

For example, the memory 1030 may store, for example, at least one different software element, such as an instruction or data associated with the program 1040, of the electronic device 1001. The program 1040 may include, for example, a kernel 1041, a library 1043, an application framework 1045 or an application program (interchangeably, "application") 1047.

The input device 1050 may include a microphone, a mouse, or a keyboard. According to an embodiment, the keyboard may include a keyboard physically connected or a keyboard virtually displayed through the display 1060.

The display 1060 may include a display, a hologram device or a projector, and a control circuit to control a relevant device. The screen may include, for example, a liquid crystal display (LCD), a light emitting diode (LED) display, an organic LED (OLED) display, a microelectromechanical systems (MEMS) display, or an electronic paper display. According to an embodiment, the display may be flexibly, transparently, or wearably implemented. The display may include a touch circuitry, which is able to detect a user's input such as a gesture input, a proximity input, or a hovering input or a pressure sensor (interchangeably, a force sensor) which is able to measure the intensity of the pressure by the touch. The touch circuit or the pressure sensor may be implemented integrally with the display or may be implemented with at least one sensor separately from the display. The hologram device may show a stereoscopic image in a space using interference of light. The projector may project light onto a screen to display an image. The screen may be located inside or outside the electronic device 1001.

The audio module 1070 may convert, for example, from a sound into an electrical signal or from an electrical signal into the sound. According to an embodiment, the audio module 1070 may acquire sound through the input device 1050 (e.g., a microphone) or may output sound through an output device (not illustrated) (e.g., a speaker or a receiver) included in the electronic device 1001, an external electronic device (e.g., the first external electronic device 1002 (e.g., a wireless speaker or a wireless headphone)) or a third external electronic device 1006 (e.g., a wired speaker or a wired headphone) connected with the electronic device 1001

The sensor module 1076 may measure or detect, for example, an internal operating state (e.g., power or temperature) or an external environment state (e.g., an altitude, a humidity, or brightness) of the electronic device 1001 to generate an electrical signal or a data value corresponding to the information of the measured state or the detected state. The sensor module 1076 may include, for example, at least one of a gesture sensor, a gyro sensor, a barometric pressure sensor, a magnetic sensor, an acceleration sensor, a grip sensor, a proximity sensor, a color sensor (e.g., a red, green, blue (RGB) sensor), an infrared sensor, a biometric sensor (e.g., an iris sensor, a fingerprint senor, a heartbeat rate monitoring (HRM) sensor, an e-nose sensor, an electromyography (EMG) sensor, an electroencephalogram (EEG) sensor, an electrocardiogram (ECG) sensor, a temperature sensor, a humidity sensor, an illuminance sensor, or an UV sensor. The sensor module 1076 may further include a control circuit for controlling at least one or more sensors included therein. According to an embodiment, the electronic device 1001 may control the sensor module 1076 by using the processor 1020 or a processor (e.g., a sensor hub) separate from the processor 1020. In the case that the separate processor (e.g., a sensor hub) is used, while the processor 1020 is in a sleep state, the electronic device 1001 may control at least part of the operation or the state of the sensor module 1076 by the operation of the separate processor without awakening the processor 1020.

According to an embodiment, the interface 1077 may include a high definition multimedia interface (HDMI), a USB, an optical interface, a recommended standard 232 (RS-232), a D-subminiature (D-sub), a mobile high-definition link (MHL) interface, a SD card/MMC interface, or an audio interface. A connector 1078 may physically connect the electronic device 1001 and the third external electronic device 1006. According to an embodiment, the connector 1078 may include, for example, an USB connector, an SD card/MMC connector, or an audio connector (e.g., a headphone connector).

The haptic module 1079 may convert an electrical signal into mechanical stimulation (e.g., vibration or motion) or into electrical stimulation. For example, the haptic module 1079 may apply tactile or kinesthetic stimulation to a user. The haptic module 1079 may include, for example, a motor, a piezoelectric element, or an electric stimulator.

The camera module 1080 may capture, for example, a still image and a moving picture. According to an embodiment, the camera module 1080 may include at least one lens (e.g., a wide-angle lens and a telephoto lens, or a front lens and a rear lens), an image sensor, an ISP, or a flash (e.g., a LED or a xenon lamp).

The power management module 1088, which is to manage the power of the electronic device 1001, may constitute at least a portion of a power management integrated circuit (PMIC).

The battery 1089 may include a primary cell, a secondary cell, or a fuel cell and may be recharged by an external power source to supply power at least one element of the electronic device 1001.

The communication module 1090 may establish a communication channel between the electronic device 1001 and an external device (e.g., the first external electronic device 1002, the second external electronic device 1004, or the server 1008). The communication module 1090 may support wired communication or wireless communication through the established communication channel. According to an embodiment, the communication module 1090 may include a wireless communication module 1092 or a wired communication module 1094. The communication module 1090 may communicate with the external device through the local wireless communication 1098 (e.g. a wireless local area network (LAN) such as Bluetooth or infrared data association (IrDA)) or the second network 1099 (e.g., a wireless wide area network (WAN) such as a cellular network) through a relevant module among the wireless communication module 1092 or the wired communication module 1094.

The wireless communication module 1092 may support, for example, cellular communication, local wireless communication, and GNSS communication. The cellular communication may include, for example, long-term evolution (LTE), LTE advanced (LTE-A), code division multiple access (CDMA), wideband CDMA (WCDMA), universal mobile telecommunications system (UMTS), wireless broadband (WiBro), or global system for mobile communications (GSM). The local wireless communication 1098 may include wireless fidelity (Wi-Fi), Wi-Fi direct, light fidelity (Li-Fi), Bluetooth, Bluetooth low energy (BLE), Zigbee, near field communication (NFC), magnetic secure transmission (MST), radio frequency (RF), or a body area network (BAN). The GNSS may include at least one of a global positioning system (GPS), a global navigation satellite system (Glonass), Beidou navigation satellite system (Beidou), the European global satellite-based navigation system (Galileo), or the like. In the disclosure, "GPS" and "GNSS" may be interchangeably used.

According to an embodiment, when the wireless communication module 1092 supports cellar communication, the wireless communication module 1092 may, for example, identify or authenticate the electronic device 1001 within a communication network using the SIM (e.g., a SIM card) 1096. According to an embodiment, the wireless communication module 1092 may include a CP separate from the processor 2820 (e.g., an AP. In this case, the CP may perform at least a portion of functions associated with at least one of elements 1010 to 1096 of the electronic device 1001 in substitute for the processor 1020 when the processor 1020 is in an inactive (sleep) state, and together with the processor 1020 when the processor 1020 is in an active state. According to an embodiment, the wireless communication module 1092 may include a plurality of communication modules, each supporting only a relevant communication scheme among cellular communication, short-range wireless communication, or a GNSS communication scheme.

The wired communication module 1094 may include, for example, include a LAN service, a power line communication, or a plain old telephone service (POTS).

For example, the local wireless communication 1098 may employ, for example, Wi-Fi direct or Bluetooth for transmitting or receiving instructions or data through wireless direct connection between the electronic device 1001 and the first external electronic device 1002. The second network 1099 may include a telecommunication network (e.g., a computer network such as a LAN or a WAN, the Internet or a telephone network) for transmitting or receiving instructions or data between the electronic device 1001 and the second external electronic device 1004.

According to various embodiments, the instructions or the data may be transmitted or received between the electronic device 1001 and the second external electronic device 1004 through the server 1008 connected with the second network. Each of the first and second external electronic devices 1002 and 1004 may be a device of which the type is different from or the same as that of the electronic device 1001. According to various embodiments, all or a part of operations that the electronic device 1001 will perform may be executed by another or a plurality of electronic devices (e.g., the first and second external electronic devices 1002 and 1004 or the server 1008). According to an embodiment, in the case that the electronic device 1001 executes any function or service automatically or in response to a request, the electronic device 1001 may not perform the function or the service internally, but may alternatively or additionally transmit requests for at least a part of a function associated with the electronic device 1001 to any other device (e.g., the first and second external electronic devices 1002 or 1004 or the server 1008). The other electronic device (e.g., the first and second external electronic devices 1002 or 1004 or the server 1008) may execute the requested function or additional function and may transmit the execution result to the electronic device 1001. The electronic device 1001 may provide the requested function or service using the received result or may additionally process the received result to provide the requested function or service. To this end, for example, cloud computing, distributed computing, or client-server computing may be used.

Various embodiments of the disclosure and terms used herein are not intended to limit the technologies described in the disclosure to specific embodiments, and it should be understood that the various embodiments and the terms include modification, equivalent, and/or alternative on the corresponding embodiments described herein. With regard to description of drawings, similar elements may be marked by similar reference numerals. The terms of a singular form may include plural forms unless otherwise specified. In the disclosure disclosed herein, the expressions "A or B", "at least one of A and/or B", "at least one of A and/or B", "A, B, or C", or "at least one of A, B, and/or C", and the like used herein may include any and all combinations of one or more of the associated listed items. Expressions such as "first," or "second," and the like, may express their elements regardless of their priority or importance and may be used to distinguish one element from another element but is not limited to these components. When an (e.g., first) element is referred to as being "(operatively or communicatively) coupled with/to" or "connected to" another (e.g., second) element, it may be directly coupled with/to or connected to the other element or an intervening element (e.g., a third element) may be present.

According to the situation, the expression "adapted to or configured to" used herein may be interchangeably used as, for example, the expression "suitable for", "having the capacity to", "changed to", "made to", "capable of" or "designed to". The expression "a device configured to" may mean that the device is "capable of" operating together with another device or other components. For example, a "processor configured to (or set to) perform A, B, and C" may mean a dedicated processor (e.g., an embedded processor) for performing corresponding operations or a generic-purpose processor (e.g., a CPU or an AP) which performs corresponding operations by executing one or more software programs which are stored in a memory device (e.g., the memory 1030).

The term "module" used in this specification may include a unit implemented with hardware, software, or firmware. For example, the term "module" may be interchangeably used with the term "logic", "logic block", "component", "circuit", and the like. The "module" may be a minimum unit of an integrated component or a part thereof or may be a minimum unit for performing one or more functions or a part thereof. The "module" may be implemented mechanically or electronically and may include, for example, an application-specific IC (ASIC) chip, a field-programmable gate array (FPGA), and a programmable-logic device for performing some operations, which are known or will be developed.

According to various embodiments, at least a part of an apparatus (e.g., modules or functions thereof) or a method (e.g., operations) may be, for example, implemented by instructions stored in a computer-readable storage media (e.g., the memory 1030) in the form of a program module. The instruction, when executed by a processor (e.g., a processor 1020), may cause the processor to perform a function corresponding to the instruction. The computer-readable recording medium may include a hard disk, a floppy disk, a magnetic media (e.g., a magnetic tape), an optical media (e.g., a compact disc ROM (CD-ROM) and a DVD, a magneto-optical media (e.g., a floptical disk)), an embedded memory, and the like. The one or more instructions may contain a code made by a compiler or a code executable by an interpreter.

Figure 11:
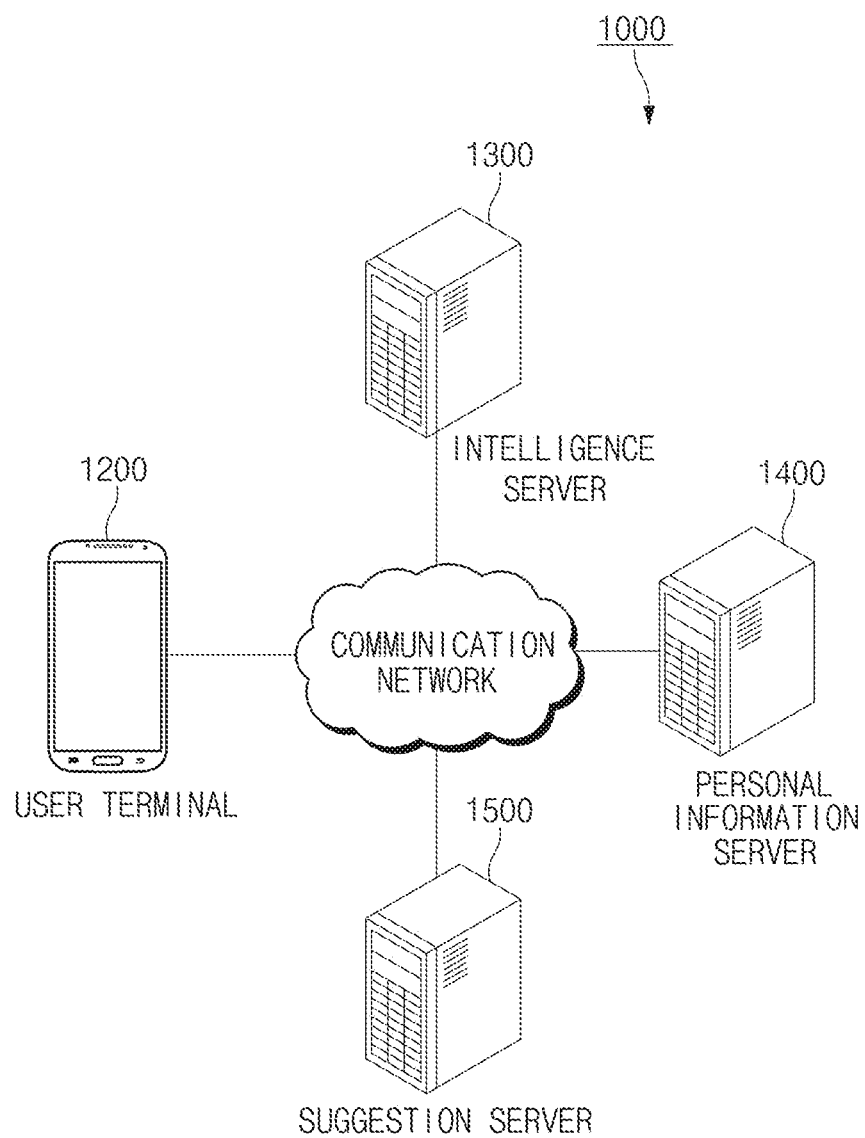
FIG. 11 is a view illustrating an integrated intelligent system, according to various embodiments of the disclosure.

FIG. 11 is a view illustrating an integrated intelligent system, according to various embodiments of the disclosure.

Referring to FIG. 11, an integrated intelligent system 1000 may include a user terminal 1200 (e.g., the electronic device of FIG. 1), an intelligence server 1300, a personal information server 1400, or a suggestion server 1500.

Referring to FIG. 11, an integrated intelligent system 1000 may include a user terminal 1200 (e.g., the electronic device of FIG. 1), an intelligence server 1300, a personal information server 1400, or a suggestion server 1500.

The user terminal 1200 may provide a service necessary for a user through an app (or an application program) (e.g., an alarm app, a message app, a picture (gallery) app, or the like) stored in the user terminal 1200. For example, the user terminal 1200 may execute and operate other app through an intelligence app (or a speech recognition app) stored in the user terminal 1200. A user input for launching and operating the other app through the intelligence app of the user terminal 1200 may be received. For example, the user input may be received through a physical button, a touch pad, a voice input, a remote input, or the like. According to an embodiment, various types of terminal devices (or an electronic device), which are connected with Internet, such as a mobile phone, a smartphone, PDA, a notebook computer, and the like may correspond to the user terminal 1200.

According to an embodiment, the user terminal 1200 may receive user utterance as a user input. The user terminal 1200 may receive the user utterance and may generate an instruction for operating an app based on the user utterance. As such, the user terminal 1200 may operate the app by using the instruction.

The intelligence server 1300 may receive a voice input of a user from the user terminal 1200 over a communication network and may change the voice input to text data. In another embodiment, the intelligence server 1300 may generate (or select) a path rule based on the text data. The path rule may include information about an action (or an operation or a task) for performing the function of an app or information about a parameter necessary to perform the action. In addition, the path rule may include the order of the action of the app. The user terminal 1200 may receive the path rule, may select an app depending on the path rule, and may execute an action included in the path rule in the selected app.

For example, the user terminal 1200 may execute the action and may display a screen corresponding to a state of the user terminal 1200, which executes the action, in a display. For another example, the user terminal 1200 may execute the action and may not display the result obtained by executing the action in the display. For example, the user terminal 1200 may execute a plurality of actions and may display only the result of a part of the plurality of actions in the display. For example, the user terminal 1200 may display only the result, which is obtained by executing the last action, in the display. For another example, the user terminal 1200 may receive the user input to display the result obtained by executing the action in the display.

The personal information server 1400 may include a database in which user information is stored. For example, the personal information server 1400 may receive the user information (e.g., context information, information about execution of an app, or the like) from the user terminal 1200 and may store the user information in the database. The intelligence server 1300 may be used to receive the user information from the personal information server 1400 over the communication network and to generate a path rule associated with the user input. According to an embodiment, the user terminal 1200 may receive the user information from the personal information server 1400 over the communication network, and may use the user information as information for managing the database.

The suggestion server 1500 may include a database storing information about a function in a terminal, introduction of an application, or a function to be provided. For example, the suggestion server 1500 may include a database associated with a function that a user utilizes by receiving the user information of the user terminal 1200 from the personal information server 1400. The user terminal 1200 may receive information about the function to be provided from the suggestion server 1500 over the communication network and may provide the information to the user.

Figure 12:
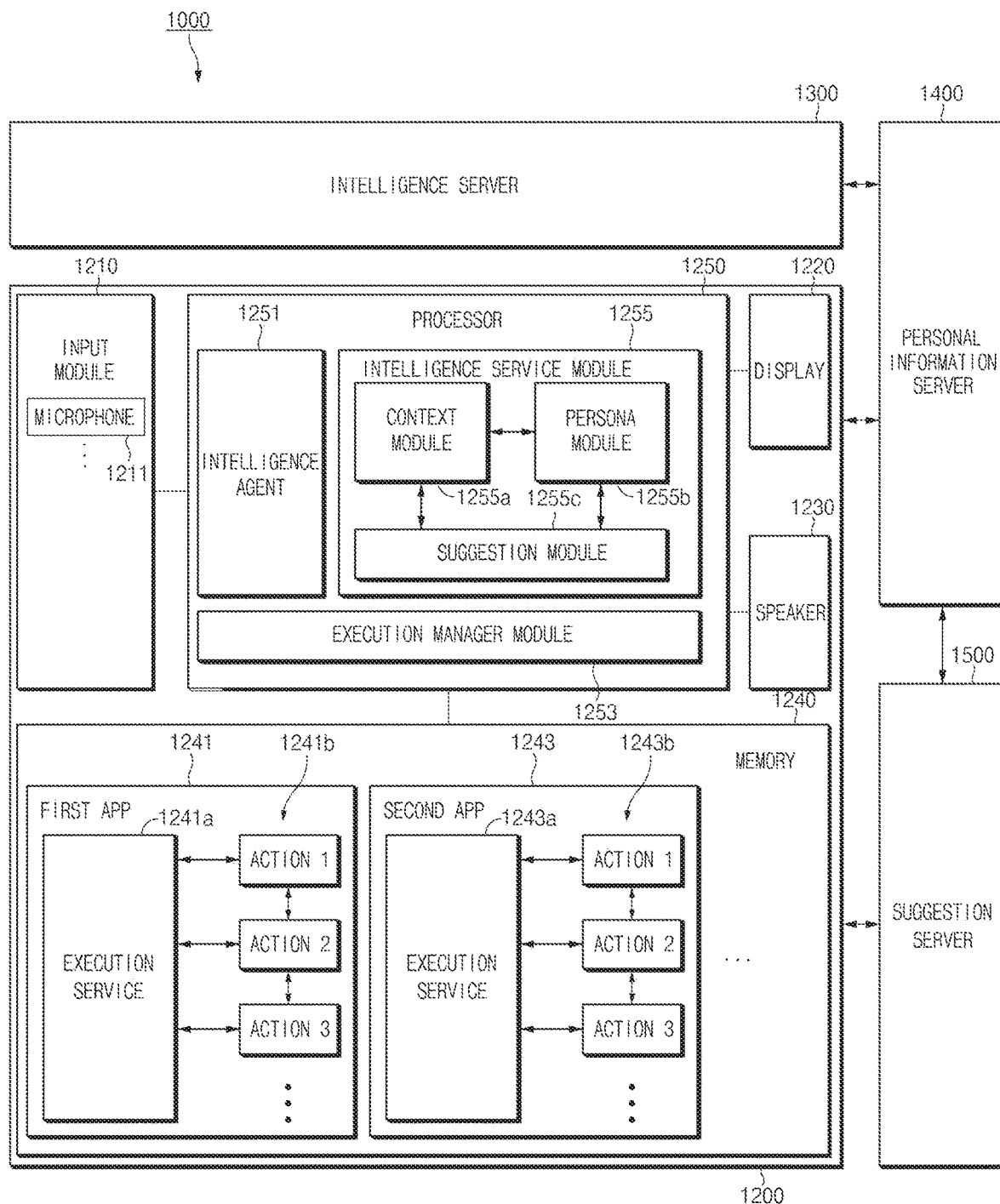
FIG. 12 is a block diagram illustrating a user terminal of an integrated intelligent system, according to an embodiment of the disclosure.

FIG. 12 is a block diagram illustrating a user terminal of an integrated intelligent system, according to an embodiment of the disclosure.

Referring to FIG. 12, the user terminal 1200 may include an input module 1210, a display 1220, a speaker 1230, a memory 1240, or a processor 1250. The user terminal 1200 may further include a housing, and elements of the user terminal 1200 may be seated in the housing or may be positioned on the housing.

According to an embodiment, the input module 1210 may receive a user input from a user. For example, the input module 1210 may receive the user input from the connected external device (e.g., a keyboard or a headset). For another example, the input module 1210 may include a touch screen (e.g., a touch screen display) coupled to the display 1220. For another example, the input module 1210 may include a hardware key (or a physical key) placed in the user terminal 1200 (or the housing of the user terminal 1200).

According to an embodiment, the input module 1210 may include a microphone that is capable of receiving the user utterance as a voice signal. For example, the input module 1210 may include a speech input system and may receive the utterance of the user as a voice signal through the speech input system.

According to an embodiment, the display 1220 may display an image, a video, and/or an execution screen of an application. For example, the display 1220 may display a graphical user interface (GUI) of an app.

According to an embodiment, the speaker 1230 may output the voice signal. For example, the speaker 1230 may output the voice signal generated in the user terminal 1200 to the outside.

According to an embodiment, the memory 1240 may store a plurality of apps 1241 and 1243. The plurality of apps 1241 and 1243 stored in the memory 1240 may be selected, launched, and executed depending on the user input.

According to an embodiment, the memory 1240 may include a database capable of storing information necessary to recognize the user input. For example, the memory 1240 may include a log database capable of storing log information. For another example, the memory 1240 may include a persona database capable of storing user information.

According to an embodiment, the memory 1240 may store the plurality of apps 1241 and 1243, and the plurality of apps 1241 and 1243 may be loaded to operate. For example, the plurality of apps 1241 and 1243 stored in the memory 1240 may be loaded by an execution manager module 1253 of the processor 1250 to operate. The plurality of apps 1241 and 1243 may include execution services 1241*a* and 1243*a* performing a function or a plurality of actions (or unit actions) 1241*b* and 1243*b*. The execution services 1241*a* and 1243*a* may be generated by the execution manager module 1253 of the processor 1250 and then may execute the plurality of actions 1241*b* and 1243*b*.

According to an embodiment, when the actions 1241*b* and 1243*b* of the apps 1241 and 1243 are executed, an execution state screen according to the execution of the actions 1241*b* and 1243*b* may be displayed in the display 1220. For example, the execution state screen may be a screen in a state where the actions 1241*b* and 1243*b* are completed. For another example, the execution state screen may be a screen in a state where the execution of the actions 1241*b* and 1243*b* is in partial landing (e.g., in the case where a parameter necessary for the actions 1241*b* and 1243*b* are not input).

According to an embodiment, the execution services 1241*a* and 1243*a* may execute the actions 1241*b* and 1243*b* depending on a path rule. For example, the execution services 1241*a* and 1243*a* may be activated by the execution manager module 1253, may receive an execution request from the execution manager module 1253 depending on the path rule, and may execute the actions 1241*b* and 1243*b* of the apps 1241 and 1243 depending on the execution request. When the execution of the actions 1241*b* and 1243*b* is completed, the execution services 1241*a* and 1243*a* may transmit completion information to the execution manager module 1253.

According to an embodiment, in the case where the plurality of the actions 1241*b* and 1243*b* are respectively executed in the apps 1241 and 1243, the plurality of the actions 1241*b* and 1243*b* may be sequentially executed. When the execution of one action (action 1) is completed, the execution services 1241*a* and 1243*a* may open the next action (action 2) and may transmit completion information to the execution manager module 1253. Here, it is understood that opening an arbitrary action is to change a state of the arbitrary action to an executable state or to prepare the execution of the arbitrary action. In other words, when the arbitrary action is not opened, the corresponding action may be not executed. When the completion information is received, the execution manager module 1253 may transmit an execution request for the next actions 1241*b* and 1243*b* to an execution service (e.g., action 2). According to an embodiment, in the case where the plurality of apps 1241 and 1243 are executed, the plurality of apps 1241 and 1243 may be sequentially executed. For example, when receiving the completion information after the execution of the last action of a first app, the app 1241 is executed, the execution manager module 1253 may transmit the execution request of the first action of a second app, the app 1243 to the execution service 1243*a*.

According to an embodiment, in the case where the plurality of the actions 1241*b* and 1243*b* are executed in the apps 1241 and 1243, a result screen according to the execution of each of the executed plurality of the actions 1241*b* and 1243*b* may be displayed in the display 1220. According to an embodiment, only a part of a plurality of result screens according to the executed plurality of the actions 1241*b* and 1243*b* may be displayed in the display 1220.

According to an embodiment, the memory 1240 may store an intelligence app (e.g., a speech recognition app) operating in conjunction with an intelligence agent 1251. The app operating in conjunction with the intelligence agent 1251 may receive and process the utterance of the user as a voice signal. According to an embodiment, the app operating in conjunction with the intelligence agent 1251 may be operated by a specific input (e.g., an input through a hardware key, an input through a touch screen, or a specific voice input) input through the input module 1210.

According to an embodiment, the processor 1250 may control overall actions of the user terminal 1200. For example, the processor 1250 may control the input module 1210 to receive the user input. The processor 1250 may control the display 1220 to display an image. The processor 1250 may control the speaker 1230 to output the voice signal. The processor 1250 may control the memory 1240 to read or store necessary information.

According to an embodiment, the processor 1250 may include the intelligence agent 1251, the execution manager module 1253, or an intelligence service module 1255. In an embodiment, the processor 1250 may drive the intelligence agent 1251, the execution manager module 1253, or the intelligence service module 1255 by executing instructions stored in the memory 1240. Modules described in various embodiments of the disclosure may be implemented by hardware or by software. In various embodiments of the disclosure, it is understood that the action executed by the intelligence agent 1251, the execution manager module 1253, or the intelligence service module 1255 is an action executed by the processor 1250.

According to an embodiment, the intelligence agent 1251 may generate an instruction for operating an app based on the voice signal received as the user input. According to an embodiment, the execution manager module 1253 may receive the generated instruction from the intelligence agent 1251, and may select, launch, and operate the apps 1241 and 1243 stored in the memory 1240. According to an embodiment, the intelligence service module 1255 may manage information of the user and may use the information of the user to process the user input.

The intelligence agent 1251 may transmit and process the user input received through the input module 1210 to the intelligence server 1300.

According to an embodiment, before transmitting the user input to the intelligence server 1300, the intelligence agent 1251 may pre-process the user input. According to an embodiment, to pre-process the user input, the intelligence agent 1251 may include an adaptive echo canceller (AEC) module, a noise suppression (NS) module, an end-point detection (EPD) module, or an automatic gain control (AGC) module. The AEC may remove an echo included in the user input. The NS module may suppress a background noise included in the user input. The EPD module may detect an end-point of a user voice included in the user input to search for a part in which the user voice is present. The AGC module may adjust the volume of the user input so as to be suitable to recognize and process the user input. According to an embodiment, the intelligence agent 1251 may include all the pre-processing elements for performance. However, in another embodiment, the intelligence agent 1251 may include a part of the pre-processing elements to operate at low power.

According to an embodiment, the intelligence agent 1251 may include a wake up recognition module recognizing a call of a user. The wake up recognition module may recognize a wake up instruction of the user through the speech recognition module. In the case where the wake up recognition module receives the wake up instruction, the wake up recognition module may activate the intelligence agent 1251 to receive the user input. According to an embodiment, the wake up recognition module of the intelligence agent 1251 may be implemented with a low-power processor (e.g., a processor included in an audio codec). According to an embodiment, the intelligence agent 1251 may be activated depending on the user input entered through a hardware key. In the case where the intelligence agent 1251 is activated, an intelligence app (e.g., a speech recognition app) operating in conjunction with the intelligence agent 1251 may be executed.

According to an embodiment, the intelligence agent 1251 may include a speech recognition module for performing the user input. The speech recognition module may recognize the user input for executing an action in an app. For example, the speech recognition module may recognize a limited user (voice) input (e.g., utterance such as "click" for executing a capturing action when a camera app is being executed) for executing an action such as the wake up instruction in the apps 1241 and 1243. For example, the speech recognition module for recognizing a user input while assisting the intelligence server 1300 may recognize and rapidly process a user instruction capable of being processed in the user terminal 1200. According to an embodiment, the speech recognition module for executing the user input of the intelligence agent 1251 may be implemented in an app processor.

According to an embodiment, the speech recognition module (including the speech recognition module of a wake up module) of the intelligence agent 1251 may recognize the user input by using an algorithm for recognizing a voice. For example, the algorithm for recognizing the voice may be at least one of a hidden markov model (HMM) algorithm, an artificial neural network (ANN) algorithm, or a dynamic time warping (DTW) algorithm.

According to an embodiment, the intelligence agent 1251 may change the voice input of the user to text data. According to an embodiment, the intelligence agent 1251 may transmit the voice of the user to the intelligence server 1300 to receive the changed text data. As such, the intelligence agent 1251 may display the text data in the display 1220.

According to an embodiment, the intelligence agent 1251 may receive a path rule from the intelligence server 1300. According to an embodiment, the intelligence agent 1251 may transmit the path rule to the execution manager module 1253.

According to an embodiment, the intelligence agent 1251 may transmit the execution result log according to the path rule received from the intelligence server 1300 to the intelligence service module 1255, and the transmitted execution result log may be accumulated and managed in preference information of the user of a persona module 1255*b*.

According to an embodiment, the execution manager module 1253 may receive the path rule from the intelligence agent 1251 to execute the apps 1241 and 1243 and may allow the apps 1241 and 1243 to execute the actions 1241*b* and 1243*b* included in the path rule. For example, the execution manager module 1253 may transmit instruction information for executing the actions 1241*b* and 1243*b* to the apps 1241 and 1243 and may receive completion information of the actions 1241*b* and 1243*b* from the apps 1241 and 1243.

According to an embodiment, the execution manager module 1253 may transmit or receive the instruction information for executing the actions 1241*b* and 1243*b* of the apps 1241 and 1243 between the intelligence agent 1251 and the apps 1241 and 1243. The execution manager module 1253 may bind the apps 1241 and 1243 to be executed depending on the path rule and may transmit the instruction information of the actions 1241*b* and 1243*b* included in the path rule to the apps 1241 and 1243. For example, the execution manager module 1253 may sequentially transmit the actions 1241*b* and 1243*b* included in the path rule to the apps 1241 and 1243 and may sequentially execute the actions 1241*b* and 1243*b* of the apps 1241 and 1243 depending on the path rule.

According to an embodiment, the execution manager module 1253 may manage execution states of the actions 1241*b* and 1243*b* of the apps 1241 and 1243. For example, the execution manager module 1253 may receive information about the execution states of the actions 1241*b* and 1243*b* from the apps 1241 and 1243. For example, in the case where the execution states of the actions 1241*b* and 1243*b* are in partial landing (e.g., in the case where a parameter necessary for the actions 1241*b* and 1243*b* are not input), the execution manager module 1253 may transmit information about the partial landing to the intelligence agent 1251. The intelligence agent 1251 may make a request for an input of necessary information (e.g., parameter information) to the user by using the received information. For another example, in the case where the execution state of the actions 1241*b* and 1243*b* are in an operating state, the utterance may be received from the user, and the execution manager module 1253 may transmit information about the apps 1241 and 1243 being executed and the execution states of the apps 1241 and 1243 to the intelligence agent 1251. The intelligence agent 1251 may receive parameter information of the utterance of the user through the intelligence server 1300 and may transmit the received parameter information to the execution manager module 1253. The execution manager module 1253 may change a parameter of each of the actions 1241*b* and 1243*b* to a new parameter by using the received parameter information.

According to an embodiment, the execution manager module 1253 may transmit the parameter information included in the path rule to the apps 1241 and 1243. In the case where the plurality of apps 1241 and 1243 are sequentially executed depending on the path rule, the execution manager module 1253 may transmit the parameter information included in the path rule from one app to another app.

According to an embodiment, the execution manager module 1253 may receive a plurality of path rules. The execution manager module 1253 may select a plurality of path rules based on the utterance of the user. For example, in the case where the user utterance specifies the app 1241 executing a part of the action 1241*b* but does not specify the app 1243 executing any other action 1243*b*, the execution manager module 1253 may receive a plurality of different path rules in which the same app 1241 (e.g., an gallery app) executing the part of the action 1241*b* is executed and in which different apps 1243 (e.g., a message app or a Telegram app) executing the other action 1243*b*. For example, the execution manager module 1253 may execute the same actions 1241*b* and 1243*b* (e.g., the same successive actions 1241*b* and 1243*b*) of the plurality of path rules. In the case where the execution manager module 1253 executes the same action, the execution manager module 1253 may display a state screen for selecting the different apps 1241 and 1243 included in the plurality of path rules in the display 1220.

According to an embodiment, the intelligence service module 1255 may include a context module 1255*a*, a persona module 1255*b*, or a suggestion module 1255*c*.

The context module 1255*a* may collect current states of the apps 1241 and 1243 from the apps 1241 and 1243. For example, the context module 1255*a* may receive context information indicating the current states of the apps 1241 and 1243 to collect the current states of the apps 1241 and 1243.

The persona module 1255*b* may manage personal information of the user utilizing the user terminal 1200. For example, the persona module 1255*b* may collect the usage information and the execution result of the user terminal 1200 to manage personal information of the user.

The suggestion module 1255*c* may predict the intent of the user to recommend an instruction to the user. For example, the suggestion module 1255*c* may recommend an instruction to the user in consideration of the current state (e.g., a time, a place, context, or an app) of the user.

Figure 13:
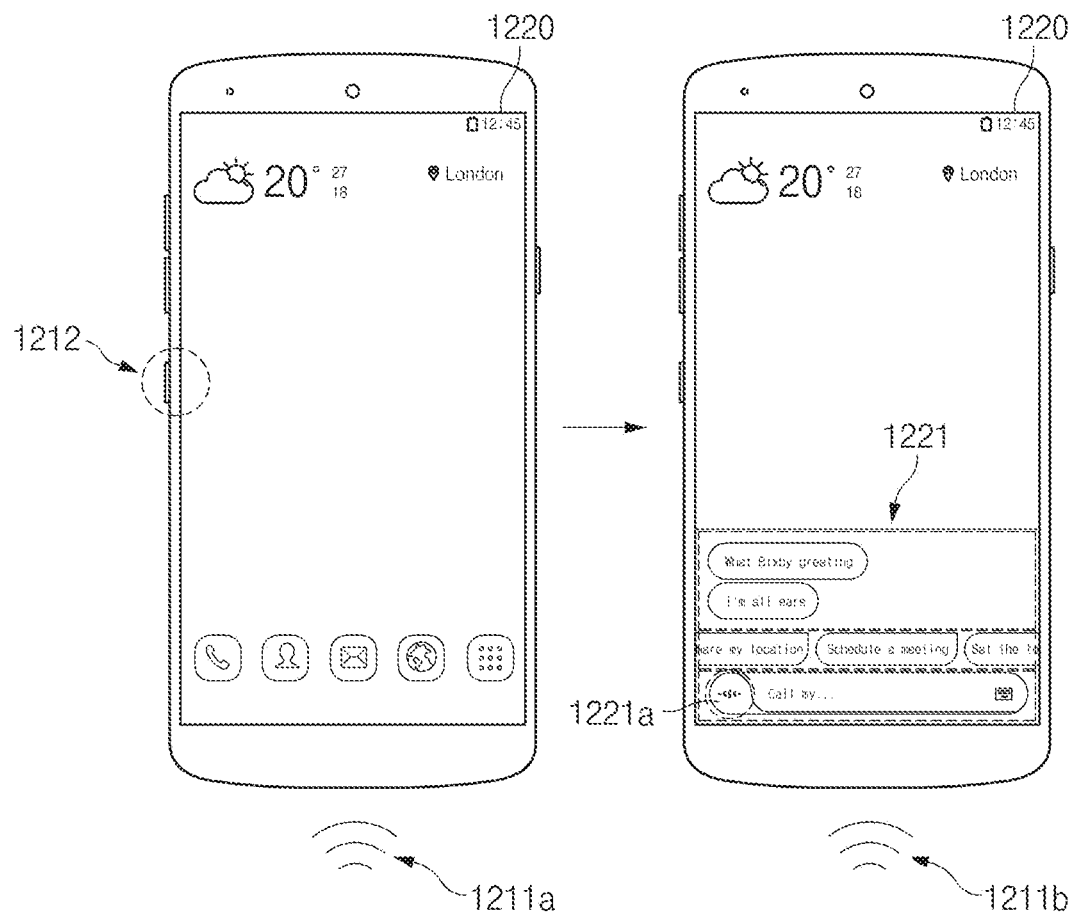
FIG. 13 is view illustrating that an intelligence app of a user terminal is executed, according to an embodiment of the disclosure.

FIG. 13 is view illustrating that an intelligence app of a user terminal is executed, according to an embodiment of the disclosure.

Referring to FIG. 13, the user terminal 1200 receives a user input to execute an intelligence app (e.g., a speech recognition app) operating in conjunction with the intelligence agent 1251.

According to an embodiment, the user terminal 1200 may execute the intelligence app for recognizing a voice through a hardware key 1212. For example, in the case where the user terminal 1200 receives the user input through the hardware key 1212, the user terminal 1200 may display a UI 1221 of the intelligence app in the display 1220. For example, a user may touch a speech recognition button 1221*a* of the UI 1221 of the intelligence app for the purpose of entering a voice 1211*b* in a state where the UI 1221 of the intelligence app is displayed in the display 1220. For another example, while continuously pressing the hardware key 1212 to enter the voice 1211*b*, the user may enter the voice 1211*b*.

According to an embodiment, the user terminal 1200 may execute the intelligence app for recognizing a voice through the microphone 1211. For example, in the case where a specified voice (e.g., wake up!) is entered (1211*a*) through the microphone 1211, the user terminal 1200 may display the UI 1221 of the intelligence app in the display 1220.

Each element (e.g., a module or a program module) according to various embodiments may be composed of single entity or a plurality of entities, a part of the above-described sub-elements may be omitted or may further include other elements. Alternatively or additionally, after being integrated in one entity, some elements (e.g., a module or a program module) may identically or similarly perform the function executed by each corresponding element before integration. According to various embodiments, operations executed by modules, program modules, or other elements may be executed by a successive method, a parallel method, a repeated method, or a heuristic method, or at least one part of operations may be executed in different sequences or omitted. Alternatively, other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:
1. An electronic device comprising:
    a microphone;
    a display;
    a memory; and
    a processor electrically connected to the microphone, the display, and the memory, wherein the processor is configured to:
        execute a speech recognition function,
        obtain a first utterance from a user through the microphone,
        output to the display a text generated based on the first utterance,
        determine at least one item of the text based on a portion of the first utterance and a personalized database of the user,
        output to the display the at least one item, which corresponds to the portion of the first utterance, that is recognized as a proper noun in the text,
        in response to detecting a training event requesting training about the portion recognized as the proper noun, output to the display a guide screen,
        obtain an input corresponding to the portion of the first utterance, and
        train the speech recognition function to recognize the portion of the first utterance as corresponding to the input,
    wherein the processor is further configured to:
        in response to determining that a number of characters of the at least one item is equal to or greater than a predetermined number of characters:
            output to the display the guide screen so as to guide an input through a keyboard which is physically connected to the display or is virtually displayed on the display; and
            obtain the input through the keyboard, or
        in response to determining that the number of characters of the at least one item is less than the predetermined number of characters:
            output to the display the guide screen so as to guide an utterance input through the microphone; and
            obtain a second utterance through the microphone.

2. The electronic device of claim 1, further comprising:
    a physical button for performing the speech recognition function,
    wherein the processor is further configured to, when an input associated with the physical button occurs, perform the speech recognition function.

3. The electronic device of claim 1, wherein the processor is further configured to:
    perform a command corresponding to the generated text by using at least one application, and
    when an event for providing a notification of an execution error of the command occurs, output on the display the at least one item associated with the at least one application.

4. The electronic device of claim 3,
    wherein the at least one application includes a call application,
    wherein the personalized database includes a contact list and a call record, and
    wherein the processor is further configured to output to the display the at least one item based on the first utterance, the contact list, and the call record.

5. The electronic device of claim 3,
    wherein the at least one application includes a web browser,
    wherein the personalized database includes a search record input in the web browser, and
    wherein the processor is further configured to output to the display the at least one item based on the first utterance and the search record.

6. The electronic device of claim 3,
    wherein the at least one application includes an email application,
    wherein the personalized database includes recipient information and sender information of an email, and
    wherein the processor is further configured to output to the display the at least one item based on the first utterance, the recipient information, and the sender information.

7. The electronic device of claim 3,
    wherein the at least one application includes a social networking application,
    wherein the personalized database includes a tag and a location tag that are input in the social networking application, and
    wherein the processor is further configured to output to the display the at least one item based on the first utterance, the tag, and the location tag.

8. The electronic device of claim 3,
    wherein the at least one application includes a map application,
    wherein the personalized database includes a place name input in the map application, and
    wherein the processor is further configured to output to the display the at least one item based on the first utterance and the place name.

9. The electronic device of claim 1, wherein the processor is further configured to:
    revise the portion recognized as the proper noun in the text, to an item selected from the at least one item, and
    output to the display the text including the revised portion.

10. The electronic device of claim 9, wherein the processor is further configured to:
store the text including the revised portion, speech data corresponding to the first utterance, and mapping information of the text and the speech data corresponding to the first utterance, in the memory.

11. The electronic device of claim 1, wherein the processor is further configured to store a second text generated based on the second utterance, speech data corresponding to the portion recognized as the proper noun in the first utterance, and mapping information of the second text generated based on the second utterance and the speech data corresponding to the portion recognized as the proper noun in the first utterance, in the memory.

12. The electronic device of claim 1, wherein the processor is further configured to store another text obtained through the keyboard, speech data corresponding to the portion recognized as the proper noun in the first utterance, and mapping information of the other text obtained through the keyboard and the speech data corresponding to the portion recognized as the proper noun in the first utterance, in the memory.

13. A method performed by an electronic device, the method comprising:
executing a speech recognition function including obtaining a first utterance from a user through a microphone;
displaying a text generated based on the first utterance in a display;
determining at least one item of the text based on a portion of the first utterance and a personalized database of the user;
displaying the at least one item, which corresponds to the portion of the first utterance and which is recognized as a proper noun, in the display;
in response to detecting a training event requesting training about the portion recognized as the proper noun, displaying a guide screen on the display;
obtaining an input corresponding to the portion of the first utterance; and
training the speech recognition function to recognize the portion of the first utterance as corresponding to the input,
wherein the displaying of the guide screen comprises:
in response to determining that a number of characters of the at least one item is equal or greater than a predetermined number of characters, displaying the guide screen so as to guide an input through a keyboard which is physically connected to the display or is virtually displayed on the display; or
in response to determining that the number of characters of the at least one item is less than the predetermined number of characters, displaying the guide screen so as to guide an utterance input through the microphone.

14. The method of claim 13, further comprising:
performing a command corresponding to the text by using at least one application,
wherein the displaying of the at least one item in the display includes, when a first event for providing a notification of an execution error of the command occurs, displaying the at least one item, which is determined based on the personalized database associated with the at least one application, in the display.

15. The method of claim 14, further comprising:
revising the portion of the text recognized as the proper noun to one item selected from the at least one item to display the revised text in the display; and
performing a command corresponding to the revised text by using the at least one application.

* * * * *